United States Patent
Arnon et al.

(10) Patent No.: US 12,537,827 B2
(45) Date of Patent: Jan. 27, 2026

(54) COLLECTIVE INTELLIGENCE IMMUNITY CYBER DETECTION AND PROTECTION

(71) Applicant: Dell Products L.P., Round Rock, TX (US)

(72) Inventors: Ohad Arnon, Beit Nir (IL); Dany Shapiro, Alfi Menashe (IL)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 18/325,471

(22) Filed: May 30, 2023

(65) Prior Publication Data

US 2024/0406192 A1    Dec. 5, 2024

(51) Int. Cl.
*H04L 9/40*     (2022.01)
*H04L 41/16*    (2022.01)

(52) U.S. Cl.
CPC .......... *H04L 63/1416* (2013.01); *H04L 41/16* (2013.01); *H04L 63/1466* (2013.01)

(58) Field of Classification Search
CPC .. H04L 63/1416; H04L 41/16; H04L 63/1466
See application file for complete search history.

(56) References Cited

U.S. PATENT DOCUMENTS

| | | | |
|---|---|---|---|
| 2016/0112445 A1* | 4/2016 | Abramowitz | G06Q 40/08 726/23 |
| 2017/0201531 A1* | 7/2017 | Kim | H04L 63/0209 |
| 2019/0158521 A1* | 5/2019 | Juliato | H04L 63/1425 |
| 2019/0238581 A1* | 8/2019 | Song | G06F 16/2474 |
| 2020/0053110 A1* | 2/2020 | Wan | H04L 67/535 |
| 2022/0237285 A1 | 7/2022 | Arnon et al. | |

OTHER PUBLICATIONS

Unknown "What is XDR?" Paloalto Networks, Cyberpedia, https://www.paloaltonetworks.com/cyberpedia/what-is-xdr, Last Accessed May 18, 2023, 9 pages.
"2017 Cost of Data Breach Study" Ponemon Institute Llc, IBM Security. [https://documents.ncsl.org/wwwncsl/Task-Forces/Cybersecurity-Privacy/IBM_Ponemon2017CostofDataBreachStudy.pdf], Jun. 2017, 35 pages.

* cited by examiner

*Primary Examiner* — Yonas A Bayou
(74) *Attorney, Agent, or Firm* — Amin, Turocy & Watson, LLP

(57) ABSTRACT

Detection of abnormal node behavior and attacks by a node(s) can be enhancedly performed and managed. A security management component (SMC) of a collective node of a node group can analyze respective groups of residual vectors associated with respective features and associated with and received from respective nodes of the node group. Based on the analysis and defined security management criteria relating to abnormal node behavior and attacks, SMC can determine whether there is abnormal node behavior and/or an attack by one or more nodes. In response to detected abnormal node behavior and/or attack by a node(s), SMC can perform a desired mitigation action. Respective SMCs of the respective nodes of the node group also can perform respective determinations regarding whether an abnormal node behavior and/or attack by a respective node exists based on their respective analysis of their respective groups of residual vectors.

20 Claims, 12 Drawing Sheets

COLLECTIVE INTELLIGENCE IMMUNITY CYBER DETECTION AND PROTECTION

BACKGROUND

Devices (e.g., communication devices, user equipment (UE), nodes, or other type of device) can communicate in a communication network environment. The devices can perform various types of operations in connection with providing various services (e.g., creating files, writing to files, storage of files and associated data, reading data from files, performing analysis on data, performing computations on data, and/or other operations or services).

The above-described description is merely intended to provide a contextual overview regarding communication networks and devices, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, analyzing, by a system comprising a processor, first residual vector data that can be received from a first device and second residual vector data that can be received from a second device, wherein the first residual vector data can be representative of a first group of residuals between a first actual state of behavior of the first device associated with a time period and a first predicted state of behavior of the first device associated with the time period, and wherein the second residual vector data can be representative of a second group of residuals between a second actual state of behavior of the second device associated with the time period and a second predicted state of behavior of the second device associated with the time period. The method further can comprise, based on a result of the analyzing and a defined abnormal device group behavior criterion that indicates what constitutes abnormal device group behavior associated with the group of devices, determining, by the system, whether an abnormal behavior associated with a group of devices exists, wherein the group of devices comprises the first device and the second device.

In certain embodiments, the disclosed subject matter can comprise a system that can include a memory that can store computer executable components, and a processor that can execute computer executable components stored in the memory. The computer executable components can comprise a data collector component that can receive a first group of residual vectors from a first node and a second group of residual vectors from a second node, wherein the first group of residual vectors can be representative of a first group of residuals between a first state of behavior of the first node associated with a time period and a first predicted state of behavior of the first node associated with the time period, and wherein the second group of residual vectors can be representative of a second group of residuals between a second state of behavior of the second node associated with the time period and a second predicted state of behavior of the second node associated with the time period. The computer executable components also can comprise a security management component that can determine whether an abnormal behavior associated with a group of nodes exists based on a result of the analysis of the first group of residual vectors and the second group of residual vectors, and based on a defined abnormal node group behavior criterion that indicates what constitutes abnormal node group behavior associated with the group of nodes, wherein the group of nodes comprises the first node and the second node.

In still other embodiments, the disclosed subject matter can comprise a non-transitory machine-readable medium, comprising executable instructions that, when executed by a processor, can facilitate performance of operations. The operations can comprise evaluating a first group of vectors that can be received from a first user equipment and a second group of residual vectors that can be received from a second user equipment, wherein the first group of vectors can relate to a first group of residuals between a first state of behavior of the first user equipment associated with a time period and a first expected state of behavior of the first user equipment associated with the time period, and wherein the second group of residual vectors can relate to a second group of residuals between a second state of behavior of the second user equipment associated with the time period and a second expected state of behavior of the second user equipment associated with the time period. The operations also can comprise determining whether a malicious behavior associated with a group of user equipment has occurred based on a result of the evaluating and a defined malicious user equipment group behavior criterion that indicates what constitutes abnormal user equipment group behavior associated with the group of user equipment, wherein the group of user equipment comprises the first user equipment and the second user equipment.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
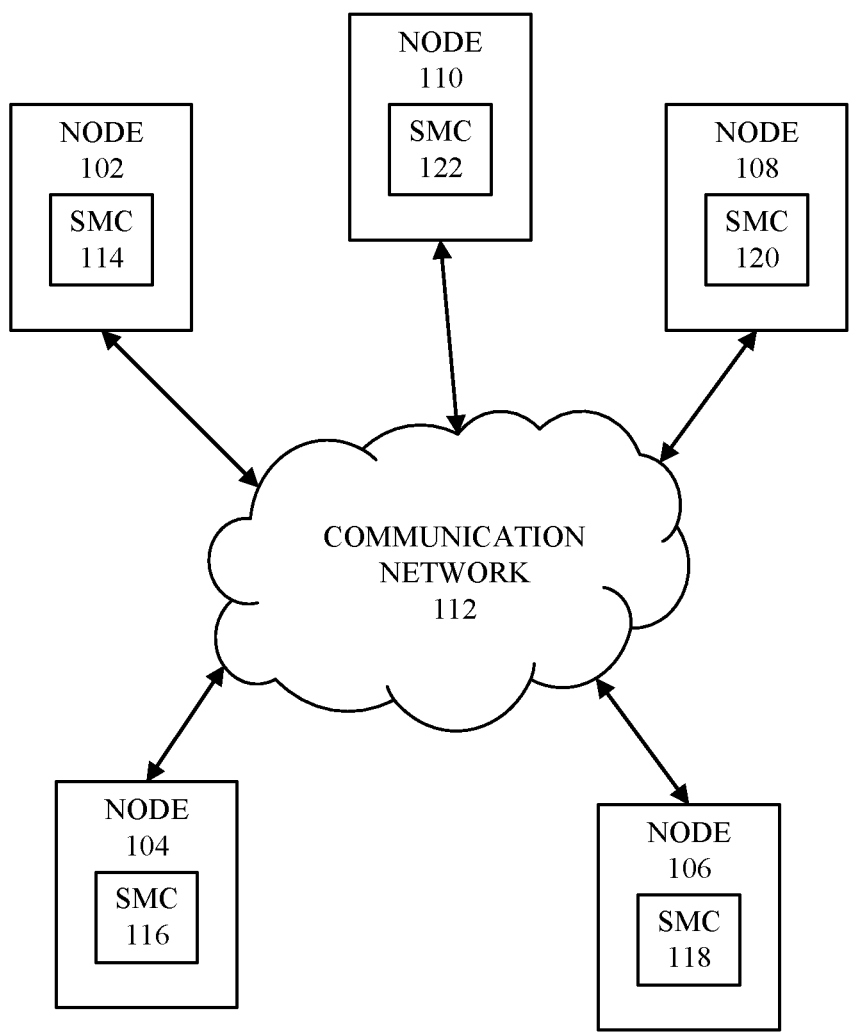
FIG. 1 illustrates a block diagram of a non-limiting example system that can desirably perform and manage detection of abnormal node behavior, threats of attack, and attacks by a node(s) of a group of nodes, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to device and network security, for example, to collective intelligence immunity cyber detection and protection. Devices (e.g., communication devices, user equipment (UE), nodes, or other type of device) can communicate in a communication network environment. The devices can perform various types of operations in connection with providing various services (e.g., creating files, writing to files, storage of files and associated data, reading data from files, performing analysis on data, performing computations on data, and/or other operations or services).

Unfortunately, malicious users can, at times, install malware on some devices to gain unauthorized access to data of those devices or other devices that communicate with those devices, infect those other devices by installing malware on those other devices, cause multiple devices to attack and overwhelm a communication network, and/or perform other unauthorized actions. Such attacks by malicious users (e.g., attackers) can be called cyber attacks. Cyber attacks today can be complex and it is generally accepted that blocking 100% of attacks can be very difficult. One type of problematic attack can be referred to as a "zero-day attack." Zero-day attacks can target vulnerabilities in devices or networks that are unknown and often can occur before or very soon after the discovery of the vulnerability.

Early cyber protection systems were designed to be reactive by nature. These early types of cyber protection systems may try to identify attack patterns and malware signatures in a controlled and isolated testing environment. Even if these early types of cyber protection systems achieved some success against known viruses or malware, threats often can be unknown to the system and can change very rapidly. Thus, zero-day attack protection, in which an unknown attack is blocked, was virtually impossible for these early types of cyber protection systems. These limitations were considered tolerable at the time in part because malware typically did not spread as fast as it does now.

Today, malware can spread and evolve much more quickly. In fact, some cyber attacks can be planned as one-shot attacks. In a one-shot attack, a specific malware version can be designed to attack only once. These types of malware can be enhanced with advanced technology and, as a result, their signatures can be difficult to track.

In response, a defensive approach began to be developed: end point detection and response (EDR). In practice, existing EDR techniques may include an agent running on a computer or a network. As part of the attack processing in EDR, data can be transmitted to a remote server to determine, based on a set of rules, whether or not a system is experiencing an attack.

Even though existing EDR techniques can present some capabilities over their predecessors because they are based on user behavior analytics, existing EDR techniques can possess several significant deficiencies and disadvantages. For instance, existing EDR techniques typically can be rule based. Consequently, their learning process typically can be manual in nature and cannot dynamically adjust to ever evolving cyber threats by malicious users. Also, communication delays often can cause problems with existing EDR techniques because of the need to communicate with a remote server. These limitations suggest that some attacks may be missed by definition. Recent research indicates, in fact, that existing EDR systems detect only 26% of initial vectors of attack and the mean time to identify a breach has increased to 197 days. Failing to identify such attacks can lead to undesirable and potentially disastrous outcomes. An entire computer, for example, can be undesirably and maliciously encrypted by a malicious attacker before the existing EDR system can react. Further, shared directories may place an entire organization at risk of a malware attack, including undesired malicious encryption of shared directories by a malicious attacker.

There are some existing machine learning approaches that have been implemented in the cyber and trust domain in recent years. However, these existing approaches only utilize information arriving from the attacker space. As a result, trying to predict what will be the next attack can be, in effect, virtually impossible because the possibilities of attacks can be practically infinite.

Some existing anti-malware techniques can be based on malware analysis in labs and distributing the malware signature/behavioral flow to the end user that uses this data to block the attack (e.g., anti-virus). However, threats often can be new, can be unknown, and can change rapidly over time. As a consequence, zero-day attacks which have not been seen before by a system using such existing anti-malware techniques may not be identified and blocked using such existing techniques. Because the signatures of the attacks can change very rapidly with the advance of technology it can become very difficult to correctly identify and prevent all attacks on devices and networks. To make matters worse, attackers (e.g., hackers) now may be able to identify whether their malicious software is running in a controlled and isolated testing environment (e.g., a controlled sandbox environment) for examination and detection purposes and, in this case, their malicious software can shut down to avoid being detected. This lack of accuracy in malware detection can lead to many false negatives and false positives which can jeopardize an organization's day-to-day performance.

Existing EDR systems generally are not sophisticated enough to prevent all attacks. They often rely on a set of learned rules that determine which program is legitimate. The ability to recognize a threat can be further complicated by the fact that the learned set of rules, which concern the legitimate software and actions, have to be frequently updated by humans monitoring the system; it is not automatic in the sense that the set of rules remains static while the system behavior may change. For example, software installations and updates have to be manually configured into the system "white-list." This approach can be costly and inaccurate and cannot be applied in real time or even near real time.

A zero-day attack that has never been seen before, where, for example, there may be no rules and no behavior known about such a zero-day attack, can be "injected" into legitimate running processes and avoid being detected by existing EDR systems. These can be manipulated by applying a legitimate software and action in a malicious manner. As an example, "BART" can abuse a zip program to zip your entire computer with "password protected." This may not be identified as malware because the program and the action are legitimate, but the extent of the action is not.

As previously stated, many cyber-protection systems rely on communication with a remote server. This dependence on remote communication may allow a malware attack to target the communication component to disable updates and severely impact detection and blocking attempts. The reliance on communications with remote servers also can lead to latency when blocking threats at least because data is discretely sent in batches over time. This can be significant and problematic because it may impact the time it takes to block an attack. Ransomware, for example, can encrypt a computer in seconds.

Even existing advanced supervised machine learning methods may not be efficient in this regard. Existing machine learning methods often attempt to predict unknown attacks. While this may improve detection capabilities, the rate of false negatives and false positives can be undesirably high. Further, the datasets for existing supervised algorithms often can be based on known malware that has already been detected. The datasets often may not contain data for unknown threats. This can undesirably limit the accuracy of the machine learning prediction and hinder the ability to predict new type of malwares. Even if some existing systems implement artificial intelligence algorithms, the level of detection can be undesirably limited due to being trained on existing examples. In fact, about 2% of cyber-attacks are never detected, and as much as 16% are detected only after months or even years.

To complicate matters even further, malware development techniques have undergone significant changes in recent years that cannot be ignored. A few years ago, an attacker's primary goal typically may have been to evade detection, and profit may have been more of a secondary goal. More recently though, attackers have realized a grave truth that the longer they can keep infected end points (e.g., devices or nodes) under their control, the more profit they can gain. As a result, this dual focus by attackers has brought a newer class of malware to prominence, that being under-the-radar malware.

One of the existing advanced cyber attack techniques to try to ensure staying under the radar as an attacker to avoid detection is to perform small and limited number of actions on each one of the infected end points (e.g., devices or nodes), ensuring that the malicious activity will not be detected in a scope of a single end point. The more end points in a single organization the attacker has control of, through malware on such end points, the more sophisticated the attack can be. This can enable the attacker to perform a relatively larger number of malicious activities on a number of end points without being detected.

As this elusive set of cyber threats continues to grow in sophistication and pervasiveness, organizations are concerned about the present and the future. Cyber threats today can take an undesirably long amount of time to detect and remediate. Future malware can undesirably disrupt or shake networks during such a period. For example, a recent study found that organizations had an average time to identify a security breach of 197 days and a time to contain a breach of 69 days. Thus, on average, it can take 266 days to remediate the attack. A lot of important information can be absorbed (e.g., by an attacker) in 266 days, and a lot of data can be lost in 69 days between detection and containment. As can be seen, existing techniques can provide relatively poor and limited cyber threat detection for advanced types of attacks and, practically, for under-the-radar attacks.

It can be desirable to overcome the deficiencies of the existing techniques relating to detecting and remediating cyber threats and attacks, including under-the-radar attacks.

To that end, techniques for desirably (e.g., efficiently, suitably, enhancedly, or optimally) performing and managing detection of abnormal node behavior, threats of attack (e.g., cyber attack), and attacks by a node(s) of a group of nodes are presented. A system can comprise a group of nodes (e.g., nodes, devices, user equipment, or other type of node). The nodes of the group of nodes can be associated with (e.g., communicatively connected to or networked with) a communication network and/or other nodes associated with the communication network. Each node of the group of nodes can comprise a security management component (SMC) that can monitor for and detect abnormal node behavior and/or security threats by one or more nodes (e.g., actual or potential attacks or threats of attack by nodes against nodes and/or the communication network).

With regard to each node, the SMC of the node can determine first time series data associated with respective features associated with the node based at least in part on results of analysis of respective first system call data relating to respective first system calls associated with the node during a first time period. The SMC of the node can determine respective predicted vectors associated with the respective features for a second time period based at least in part on application of a trained time series model to the respective first time series data. The SMC also can determine second time series data associated with respective features associated with the node for the second time period based at least in part on results of analysis of respective second system call data relating to respective second system calls associated with the node during a second time period. The SMC can determine actual vectors associated with the respective features for the second time period based at least in part on the second time series data. The SMC can determine respective residual vectors based at least in part on the results of analysis (e.g., comparison) of the respective predicted vectors associated with the respective features and actual vectors associated with the respective features for the second time period. In some embodiments, the SMC can input the respective residual vectors to trained behavioral model (e.g., of the SMC) and the trained behavioral model can generate output data that can comprise a probability value that there is abnormal behavior and/or a threat of an attack associated with (e.g., by or against) the node, in accordance with defined security management criteria relating to abnormal behavior or threats associated with nodes.

In certain embodiments, a node of the group of nodes can act as a collective intelligence immunity system (CIIS) node on behalf of the group of nodes to facilitate detecting abnormal behavior and/or security threats by one or more nodes of the group of nodes. The respective nodes can communicate respective residual data (e.g., residual vector data, structured table data, and/or other data) relating to the respective residual vectors associated with the respective nodes to the CIIS node. In some embodiments, with regard to each node, the SMC of the node can omit an residual vector that has a zero value from the residual data, and, with regard to any residual vector associated with a feature(s) that has a value (e.g., non-zero value) that is determined to be within a normal behavior range of values associated with the feature(s), the SMC can generate corresponding structured table data associated with the feature(s) that can be representative of such residual vector associated with the feature(s), wherein the structured table data can contain a lower amount of data than the corresponding residual vector. Omitting zero value residual vectors from the residual data and/or replacing a residual vector associated with a feature(s) having a value in the normal range with corresponding structured table data associated with the feature(s) can desirably (e.g., suitably, enhancedly, or optimally) result in a lower amount of data being communicated from the node to the CIIS node.

Also, with regard to each node, while the residual data associated with a feature(s), and associated with the node and/or a user(s) (e.g., one or more users), can relate to the node and/or the user(s), the residual data (e.g., generation of the residual data by the SMC) desirably (e.g., suitably, enhancedly, or optimally) can anonymize and maintain (e.g., preserve) the privacy of the node-related data and/or user(s)-related data (e.g., the raw node-related data and/or user(s)-related data), including the privacy of node-specific and/or user-specific (e.g., user-identifiable or otherwise user-specific) details of or relating to the node and/or user(s), upon which the residual data can be based and generated. Accordingly, privacy of the node-related data and/or user(s)-related data can be desirably maintained when the SMC of the node communicates the residual data to the CIIS node.

The SMC of the CIIS node can receive the respective residual data relating to the respective residual vectors associated with the respective features and associated with the respective nodes from the respective nodes. If any residual vector is determined to be missing (e.g., due to having a zero value) from the respective residual data, the SMC can insert a zero value into the respective residual data (e.g., insert a zero value into an appropriate temporal location in the respective residual data that corresponds to the missing zero residual vector value and associated node). The SMC can analyze the respective residual data (e.g., as updated to include any inserted zero value(s)) associated with the respective features and the respective nodes and/or can apply (e.g., input) such respective residual data to a trained behavioral model of the SMC (e.g., for analysis).

Based at least in part on the results of such analysis and defined security management criteria relating to abnormal node group behavior and attacks, the SMC can determine whether there is abnormal node group behavior, a threat of attack, and/or an attack by one or more nodes of the group of nodes. If the SMC of the CIIS node determines that there is an abnormal node group behavior and/or threat of attack by one or more nodes of the group of nodes, the SMC can verify whether the abnormal node group behavior and/or threat of attack is an actual attack by the one or more nodes, and/or can perform a desired mitigation action in response to the abnormal node group behavior and/or threat of attack, or an actual attack, if verified.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, suitably, enhancedly, or optimally) perform and manage detection of abnormal node behavior, threats of attack (e.g., cyber attack), and attacks by a node(s) of a group of nodes, in accordance with various aspects and embodiments of the disclosed subject matter. Malicious users can utilize malware to attempt to attack various types of assets associated with one or nodes associated with one or more entities (e.g., users, organizations, businesses, clients, and/or other entities). Assets can include, for example, applications, credentials (e.g., user, entity, or device credentials), various types of data, code, communications, patterns, backups, messages (e.g., email messages, text messages, or other types of messages), databases, servers, data storage, or other types of assets. The threats of attack against assets, nodes, and/or entities by malicious users can comprise external threats that can be external to a node, a group of nodes, or an entity, or internal threats that may be associated with (e.g., situated within) the node, group of nodes, or entity.

For example, a malicious user may use ransomware against a node(s) that may encrypt data stored on the node(s), and the malicious user can demand a ransom from the user (e.g., owner, manager, or other authorized user or operator of the node(s)) if the user desires to have the encrypted data decrypted and available to the user again. As another example, a malicious user may use malware in the form of a keylogger that can track and record keystrokes as a user types into a device to steal input (e.g., user credentials) to the device or account of a user and use such stolen data input to fraudulently access the device or account of the user. Other threats of attack by malicious users may use the assets associated with a user to access bank accounts, steal technology, commit espionage, or commit other fraud or malicious acts. The possibilities and functionality of threats can be seemingly endless and can be continually generated, which can help explain the difficultly in detecting and stopping all threats of attack.

The system 100 can comprise a group of nodes (e.g., node equipment or devices), which can comprise a desired number of nodes, including node 102, node 104, node 106, node 108, and/or node 110. At desired times, the nodes (e.g., 102, 104, 106, 108, and/or 110) can be associated with (e.g., communicatively connected) a communication network 112 to facilitate communication of data between a node (e.g., 102, 104, 106, 108, or 110) and the communication network 112, and/or facilitate communication of data between the nodes via the communication network 112.

Each node (e.g., 102, 104, 106, 108, and/or 110) can comprise, employ, and/or access data processing resources (e.g., processor(s)), storage resources (e.g., data store(s)), applications, and/or other resources that can enable the node to perform one or more services. The one or more services can be or can relate to, for example, data communications, data processing, video streaming, audio streaming, data security or protection, multimedia service, news service, financial service, social networking, and/or another desired type of service. A node (e.g., 102, 104, 106, 108, or 110) can be a computer, a laptop computer, a server, a wireless, mobile, or smart phone, electronic pad or tablet, a virtual assistant (VA) device, electronic eyewear, electronic watch, or other electronic bodywear, an electronic gaming device, an Internet of Things (IoT) device (e.g., health monitoring device, toaster, coffee maker, blinds, music players, speakers, a telemetry device, a smart meter, a machine-to-machine (M2M) device, or other type of IoT device), a device of a connected vehicle (e.g., car, airplane, train, space rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used. The respective nodes (e.g., 102, 104, 106, 108, and/or 110) can be associated with (e.g., communicatively connected to) the communication network 112 and/or each other via respective communication connections and channels, which can include wireless or wireline communication connections and channels.

The communication network 112 can comprise various network equipment (e.g., routers, gateways, transceivers, switches, base stations, access points, radio access networks (RANs), or other devices) that facilitate (e.g., enable) communication of information between respective items of network equipment of the communication network 112, communication of information between the nodes (e.g., 102, 104, 106, 108, and/or 110) and the communication network 112, and communication of information between the nodes. The communication network 112 can provide or facilitate wireless or wireline communication connections and channels between the nodes (e.g., 102, 104, 106, 108, and/or 110) and the communication network 112. For reasons of brevity or clarity, the various network equipment, components, functions, or devices of the communication network 112 are not explicitly shown.

It can be desirable for the nodes, individually and/or collectively, to be able to detect threats of attack (e.g., malicious attack) associated with one or more of the nodes, including detecting zero-day attacks, under-the-radar attacks, and/or other types of attacks, and/or threats of such types of attacks, as described herein.

To that end, in accordance with various embodiments, the respective nodes (e.g., 102, 104, 106, 108, and/or 110) can comprise respective security management components (SMCs), such as SMC 114, SMC 116, SMC 118, SMC 120, and SMC 122, respectively, that can perform and manage security management functions, including detecting abnormal behavior (e.g., anomaly detection), threats of attack (e.g., cyber security threats of attack), and/or attacks (e.g., actual cyber attacks, such as zero-day attacks, under-the-radar attacks, and/or other types of attacks) associated with (e.g., by or against) one or more nodes (e.g., 102, 104, 106, 108, and/or 110) and/or the communication network 112, in accordance with defined security management criteria, such as described herein. In other embodiments, an SMC can be a standalone component or can reside in another device or component (e.g., in addition to or instead of residing in the nodes), wherein such an SMC can be associated with (e.g., communicatively connected to) all of the nodes and/or the communication network 112, and can perform and manage the security management functions described herein, in accordance with the defined security management criteria.

In certain embodiments, at particular times (e.g., during particular time periods), it can be desirable (e.g., wanted or otherwise desired) to have an SMC (e.g., 114, 116, 118, 120, or 122) that can act or operate as a CIIS SMC (e.g., of a CIIS node) that can receive information, such as residual vector data or other data relating to security of the nodes (e.g., 102, 104, 106, 108, and/or 110) and communication network 112, from the nodes. For example, at desired times, the SMC 122 of the node 110 can act as the CIIS SMC (and the node 110 can act as the CIIS node) on behalf of the group of nodes (e.g., 102, 104, 106, 108, and/or 110) and communication network 112. If, for some reason (e.g., failure of the node 110 or SMC 122; infection of the node 110 with malware; or other reason) the SMC 122 and/or node 110 are unable or not suitable to act as the CIIS SMC and/or node, at other desired times, another SMC (e.g., 114, 116, 118, or 120) and node (e.g., 102, 104, 106, or 108) can act as the CIIS SMC and/or node.

The computing environment of a node (e.g., 102, 104, 106, 108, or 110) can be virtual and/or physical. The computing environment also can be a server computer (e.g., local or cloud-based server computer), an online compute instance, a cluster of servers, a container or microapplication, or other grouping or network. With regard to the SMC (e.g., 114, 116, 118, 120, or 122) of a node (e.g., 102, 104, 106, 108, or 110), depending in part on the structure or nature of the computing environment of the node, one or more instances of the SMC (e.g., an anomaly detection engine and other components of the SMC) can be deployed and these related instances also can be able to communicate with one another such that a threat detected on one network or one network connected device also can also start a process to protect other network connected devices, including storage devices, servers, remote devices, and the like.

In accordance with various embodiments, all or part of the SMC (e.g., 114, 116, 118, 120, or 122) of a node (e.g., 102, 104, 106, 108, or 110) can be implemented in a kernel of an operating system of the node. A kernel can be defined in various ways. By way of example only, a kernel can establish a bridge between hardware and software of the node (e.g., computing device). As another example, the kernel can control all or some of the programs and processes running on the node. As still another example, the kernel can perform and control memory management, process management, disk management, task management, and/or other functions of the node. When the SMC (e.g., 114, 116, 118, 120, or 122) detects a threat of attack, the kernel can quickly stop the processes associated with the attack or threat of attack. The SMC can be implemented in physical machines, virtual machines, microservices, containerized applications, and/or other types of components or structures. In addition, in some embodiments, the SMC or other components described herein can be implemented in various environments that can comprise virtual machines, micro-applications, containers, and/or other types of components or structures. In each of these environments, there can be an operating system involved and embodiments and functions of the SMC and other components described herein can be implemented in the corresponding kernel associated with the operating system. For example, in the case of virtualization, embodiments and functions of the SMC and other components described herein can be implemented in layers with one layer being in the host and other layers being on each virtual machine. A microservice can be an application running on an operating system. Similarly, containers and virtual machines also can be associated with operating systems and embodiments and functions of the SMC and other components described herein can operate in or be implemented as a module of the operating system, such as a kernel module in the kernel of the operating system.

Generally, in accordance with various embodiments, the SMC (e.g., 114, 116, 118, 120, or 122) of a node (e.g., 102, 104, 106, 108, or 110), on an individual basis, or an SMC of a node acting as a CIIS SMC of a CIIS node, with respect to the group of nodes, can be configured to respond to threats based at least in part on normal behavior of the system 100 (e.g., one or more nodes of the system 100) or, more particularly, based at least in part on deviations or anomalies in the normal behavior. This can be distinct from existing systems that can attempt to focus on characteristics of the threat or that can rely on information outside of the system being protected. For example, virus protection techniques that can be based on virus signatures can rely on the characteristics of the threat itself. In contrast, an SMC of the system 100, similar to a biological immunity system, can operate in the environment and respond when the environment is determined by the SMC (or another SMC, such as a CIIS SMC) to be abnormal.

Figure 2:
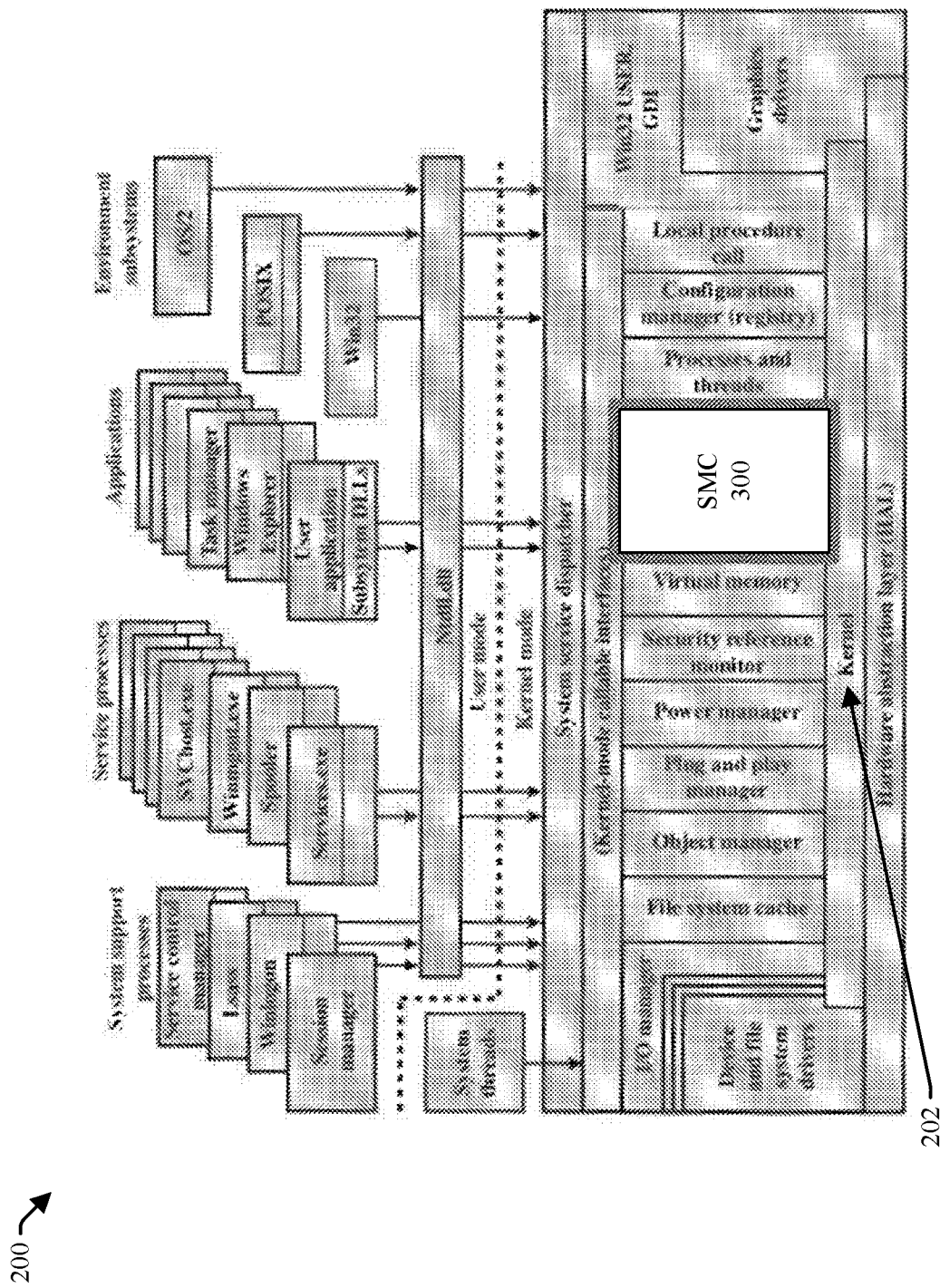
FIG. 2 depicts a block diagram of a non-limiting example operating system of a node in which a security management component (SMC) of a node can be situated and can operate, in accordance with various aspects and embodiments of the disclosed subject matter.
Figure 3:
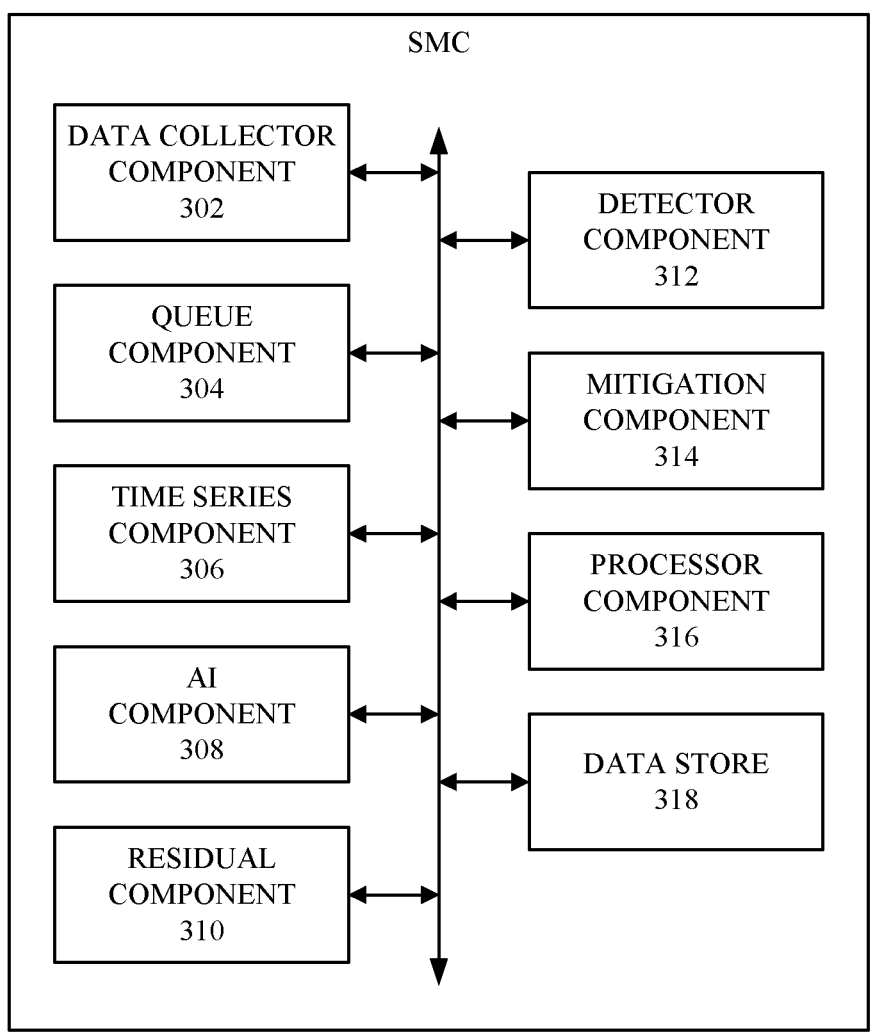
FIG. 3 illustrates a block diagram of a non-limiting example SMC of a node, in accordance with various aspects and embodiments of the disclosed subject matter.
Figure 4:
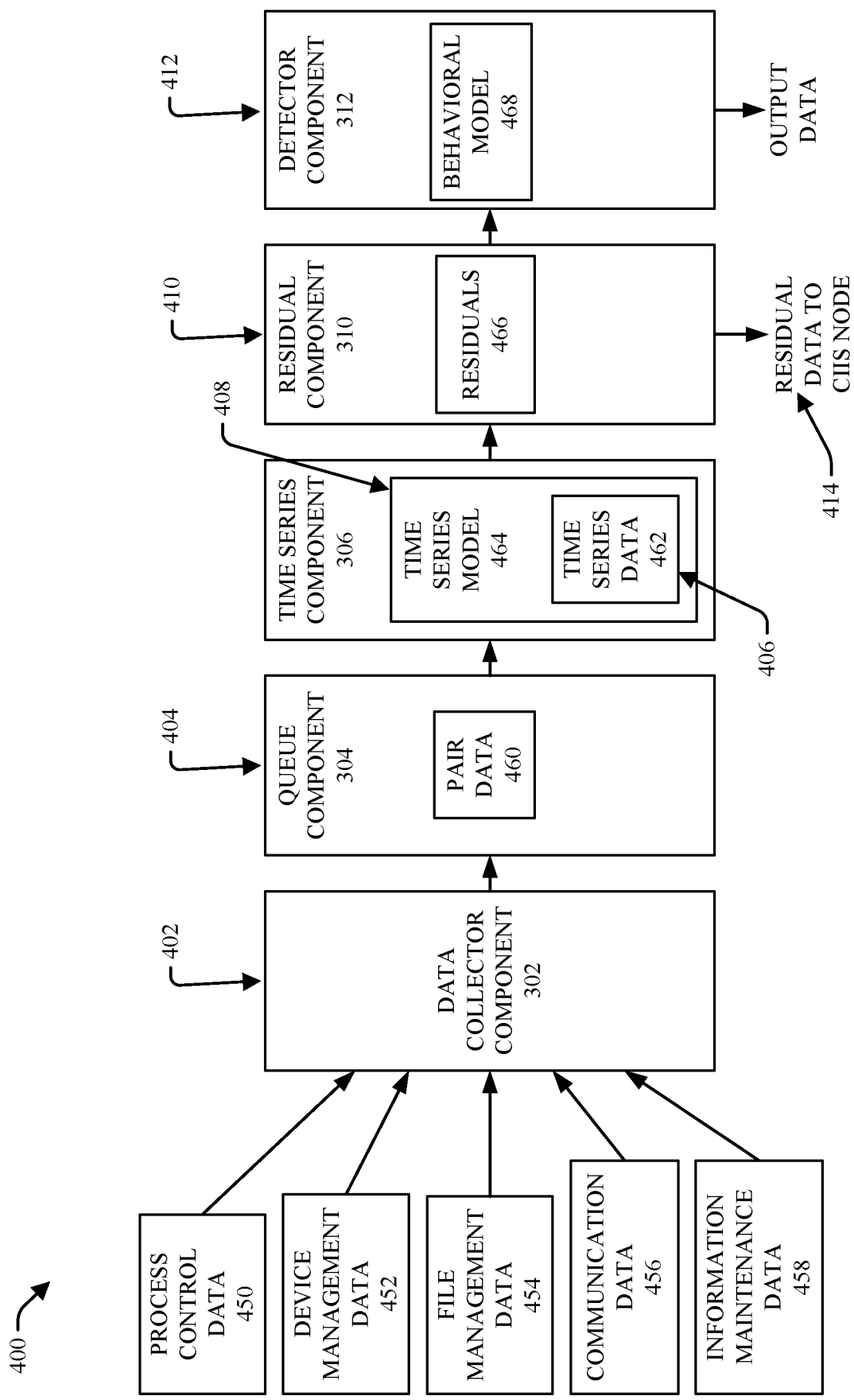
FIG. 4 depicts a block diagram of a non-limiting example operational flow process that can be performed to detect abnormal behavior associated with a node, in accordance with various aspects and embodiments of the disclosed subject matter.

Referring to FIGS. 2, 3, and 4 (along with FIG. 1), FIG. 2 depicts a block diagram of a non-limiting example operating system 200 of a node in which an SMC of a node can be situated and can operate, FIG. 3 illustrates a block diagram of a non-limiting example SMC 300 of a node, and FIG. 4 depicts a block diagram of a non-limiting example operational flow process 400 that can be performed (e.g., by an SMC of a node) to detect abnormal behavior associated with a node, in accordance with the various aspects and embodiments of the disclosed subject matter. The SMC 300 of FIG. 3 can be same as or similar to any of the SMCs (e.g., 114, 116, 118, 120, or 122) of any of the nodes (e.g., 102, 104, 106, 108, or 110), and the SMCs (e.g., 114, 116, 118, 120, or 122) of the nodes (e.g., 102, 104, 106, 108, or 110) can have the same or similar functionality and/or components as the SMC 300, and the operations described herein with regard to the SMC 300 can be performed by any of the SMCs (e.g., 114, 116, 118, 120, or 122) of any of the nodes (e.g., 102, 104, 106, 108, or 110). In some embodiments, each of the nodes (e.g., 102, 104, 106, 108, and 110), employing their respective SMCs (e.g., 114, 116, 118, 120, or 122) can individually perform the operational flow process 400 of FIG. 4.

The example operating system 200 of FIG. 2 can be, for example, a Windows or Windows-based operating system in some embodiments, although, in other embodiments, the operating system 200 can be a Macintosh operating system (e.g., macOS), Linux, Unix, a mobile device operating system (e.g., iOS, Android), or other type of operating system. The example operating system 200 can comprise the SMC 300 that can be situated in or can be associated with a kernel 202 of the operating system 200, in accordance with various aspects and embodiments of the disclosed subject matter. The operating system 200 also can comprise various other components, such as presented in the operating system 200 of FIG. 2. It is to be appreciated and understood that, in other embodiments, the operating system 200 can comprise another group of components that can be different from (e.g., can have one or more components that can be different from) the group of components depicted in the operating system 200. It also is to be appreciated and understood that, in other embodiments, the SMC 300 can be situated in another part of a node (e.g., 102, 104, 106, 108, or 110) besides the kernel 202, or can be located outside of such node and can be associated with (e.g., communicatively connected to) such node.

In certain embodiments, functions relating to the detection of behavior of a node and anomalies (e.g., deviations from desired or expected node behavior) can be implemented by the SMC 300 of a node (e.g., 102, 104, 106, 108, or 110) as a pipeline. As part of the pipeline, the SMC 300 can comprise and/or implement a time series model that can be configured (e.g., structured and trained) to predict the respective future behaviors associated with respective features associated with the node based at least in part on system call data, log data, and/or other data that can relate to or facilitate determining the behavior of the node. With regard to each feature, the SMC 300 can compare the prediction (e.g., a predicted value or vector) of a future behavior associated with a feature to a determined actual value or vector associated with the feature, and, based at least in part on the comparison, can determine and generate a comparison result that can be residual data associated with the feature. Such residual data (e.g., residual vector or other residual data derived therefrom) can be or can indicate a difference between the predicted value or vector and the actual value or vector associated with the feature. The SMC 300 can input the respective items of residual data associated with the respective features associated with the node to a trained behavioral model (e.g., a Gaussian Mixture Model (GMM)) for analysis (e.g., AI and/or ML-based analysis), which can determine whether there is abnormal behavior associated with one or more features associated with the node, and can provide an output (e.g., output data) that can indicate whether the respective behaviors associated with the respective features are determined to be normal or abnormal.

In some embodiments, a GMM (e.g., a trained GMM utilized by an individual node or utilized by a CIIS SMC of a CIIS node), which can be a probabilistic clustering model, can assume that each data point belongs to a Gaussian distribution, and anomaly detection, utilizing the GMM model, can be the process of identifying unusual or outlier data points relative to (e.g., in relation to) other data points associated with the GMM model. The GMM can provide (e.g., output) a probability distribution of an attack (e.g., under-the-radar attack or other type of attack) being executed by one or more nodes (e.g., 102, 104, 106, 108, and/or 110). GMM can detect outliers by identifying any data points that are located in low-density regions associated with the model. This can provide a desirable ability for the SMC 300 (e.g., a CIIS SMC of a CIIS node), utilizing the GMM, to collect what otherwise may be considered meaningless jitter (e.g., jitter that appears to be, or ostensibly is, normal jitter) from several nodes that, when considered jointly, can create or identify an outlier in the GMM model (e.g., CIIS GMM model) employed by the CIIS SMC of the CIIS node, such as described herein. Such an outlier can represent, reflect, or indicate abnormal behavior by a subgroup of nodes (e.g., the several nodes) that can be interpreted (e.g., by the SMC 300) as being a threat of attack or an actual attack (e.g., a threat of, or an actual, under-the-radar distributed attack against the system). From the output of the GMM, the SMC 300 can detect which of the features created the anomalies, which nodes are associated with the detected anomalies, and which nodes are or may be infected with malware (e.g., under-the-radar malware or other type of malware).

In some embodiments, the behavioral model can be trained (e.g., by the SMC 300 and/or another component or entity) with typical or normal residuals. By training the behavioral model with typical or normal residuals, an abnormal residual can impact the output of the trained behavioral model and can indicate a threat of attack associated with (e.g., against and/or by) the node. In some embodiments, in response to detecting such a threat, the SMC 300 can manage a process that caused the output to indicate the threat by performing, initiating performance of, or facilitating performance of a mitigation action (e.g., suspend the process, terminate the process, isolate the process, sideline or isolate data associated with the process, monitor the process (e.g., more closely or in more detail), and/or other desired mitigation action) to mitigate the threat.

The pipeline employed by the SMC 300 can include multiple stages. The first stage can include a self-recognition monitor function of the SMC 300 that can be running as a part of the kernel 202 of the operating system 200 of the node. The first stage can involve the SMC 300 collecting information relating to operating system behavior (e.g., system calls). In a second stage, which also can be part of the self-recognition monitor function, a time series model (e.g., a time series-based ML model) can be trained (e.g., automatically trained by the SMC 300 and/or another component or entity) based at least in part on the information or features extracted by the SMC 300 from the system calls and/or other information associated with the node. In certain embodiments, the SMC 300 can configure the time series model to learn seasonality. For example, the SMC 300 can perform certain updates on the time series model daily, weekly, monthly, or at other desired periodic or non-periodic times based at least in part on respective information (e.g., system call information or other information) associated with node that can be associated with (e.g., in relative temporal proximity to) those respective times of the updates. Based at least in part on such updates, the time series model can learn multiple aspects of normal behavior associated with the node, including expected real time behavior, seasonality based behavior, and/or other type of behavior associated with the features associated with the node. The time series model can be updated (e.g., by the SMC 300 and/or another component or entity) constantly or continuously as the behavior associated with the node changes, as software (e.g., new software) is added/updated with respect to the node, as hardware associated with the node is changed or updated, and/or as other changes associated with the node occur, or combination thereof. In other words, the time series model can be updated on some basis (e.g., periodically or aperiodically) to account for changes in behavior associated with the device over time. This can allow the time series model to be kept up to date with respect to normal behavior associated with the node. In a third stage, which may be implemented in or by a self-recognition entity function of the SMC 300, the SMC 300 can employ the behavioral model (e.g., GMM model) that can detect an anomaly (e.g., abnormal behavior, or deviation from normal behavior) from a baseline (e.g., baseline behavior associated with a feature) associated with the node. The behavioral model can be trained based at least in part on residual vectors associated with features associated with the node, such as described herein. If the behavioral model detects an anomaly associated with a feature associated with the node, the SMC 300 can perform a desired mitigation action (e.g., task or process suspension or termination, an "access denied" action, or other desired mitigation action) on or with respect to the to the task or process that caused the anomaly. The behavioral model also can be trained continually, periodically, or aperiodically with the time series model output (e.g., residuals). This behavior by and functionality of the pipeline (e.g., the components and functions associated with the pipeline) of the SMC 300 can be achieved in part because the anomaly detection engine of the SMC 300 can be, for example, a kernel module of the kernel 202. The anomaly detection engine of the SMC 300 can be located in the kernel 202 of the operating system 200 of the node, and, as a result, there desirably can be very small to virtually zero latency with regard to anomaly detection associated with the node.

The SMC 300, rather than relying on (e.g., relying only on) characteristics of the attack threat, can determine or identify normal behavior associated with the node, or group of nodes (e.g., 102, 104, 106, 108, and/or 110), and/or can be trained (e.g., can employ AI and/or ML-based models, such as the time series model and the behavioral model) to recognize or identify normal behavior and/or abnormal behavior (e.g., anomalous behavior) associated with the node or group of nodes. The SMC 300 can identify a particular process as being, or being associated with, a threat of attack when that process (e.g., execution of the process, or operations associated with the process) results in or is determined to cause a deviation from the normal or expected behavior of the node or system.

In accordance with the example operational flow process 400 of FIG. 4 and the example SMC 300 of FIG. 3, a data collector component 302 of the SMC 300 of a node (e.g., 102, 104, 106, 108, or 110) can receive (e.g., collect, obtain, or otherwise receive) data, including system call data, log data, and/or other data that can relate to or facilitate determining the behavior of the node or associated operating system, as indicated at reference numeral 402 of the operational flow process 400. For instance, each operation of a process in the operating system 200 can be interpreted as a system call or a group of system calls. The system calls each can be made by specific processes, wherein each process can have a process identifier (ID). The data collector component 302 can receive or collect such data on a continuous or ongoing basis during operation of the node, and such data can be processed by the SMC 300 on a continuous or ongoing basis, such as described herein.

The data can be collected or aggregated into a queue component 304 (e.g., a centralized queue) of the SMC 300, as indicated at reference numeral 404 of the operational flow process 400. The data collected can include, by way of example and not limitation, process control data 450 relating to process control associated with the operating system 200, device management data 452 relating to data management associated with the operating system 200, file management data 454 relating to file management associated with the operating system 200, communication data 456 relating to communications associated with the operating system 200, information maintenance data 458 relating to information maintenance associated with the operating system 200, and/or other types (e.g., categories) of data associated with the operating system 200 or node (e.g., 102, 104, 106, 108, or 110). Such data can be related to system calls, logs, and/or other data relating to processes or operations associated with the node. Inserting the data into the queue component 304 can allow for asynchronous processing of the data by the SMC 300.

The process control data 450 can relate to actions such as, for example, load, execute, allocate, and/or other process control-related actions, operations, or processes. The device management data 452 can relate to, for example, request, read, get, and/or other device management-related operations or processes. The file management data 454 can relate to, for example, create, open, read, and/or other file management-related operations or processes. The communication data 456 can relate to send, transfer, and/or other communications-related operations or processes. The information maintenance data 458 can comprise or relate to, for example, system data, dates, process attributes, and/or other information maintenance-related data, operations, or processes. The data collected into the queue component 304 can comprise at least information relating to operating system behavior of the operating system 200.

Once the data has been collected, the queue component 304 or another component of the SMC 300 can organize (e.g., arrange) the data in the queue component 304 as pair data 460. In some embodiments, the pair data 460 can be organized in the queue component 304 as or based at least in part on a desired format, structure, or arrangement, such as Process ID: Action, wherein the Process ID can be an identifier associated with a process associated with an item of data, and Action can relate to or indicate the type of action associated with the item of data, and wherein respective processes can be associated with respective (e.g., different or unique) process IDs.

The SMC 300 can comprise a time series component 306 that can analyze the pair data 460, and can generate time series data 462 based at least in part on a result of the analysis of the pair data 460, as indicated at reference numeral 406 of the operational flow process 400. In some embodiments, the pair data 460, when processed by the time series component 306, can be organized as vectors of actions per process ID and/or vectors of Process ID: Action. The time series component 306 can transform these vectors into numeric data. For example, the number of write actions per second for a particular process can be an example of time series data. This data can act as time series data features. The SMC 300 can learn or determine temporal patterns identified in or extracted from the time series data 462. In certain embodiments, the time series component 306 can extract, determine, or identify features from the time series data 462.

The time series component 306 can comprise or employ a trained time series model 464 (e.g., an AI and/or ML-based time series model), as indicated at reference numeral 408 of the operational flow process 400. The trained time series model 464 can be generated, adapted, and/or trained by an AI component 308 and/or the time series component 306 of the SMC 300, such as described herein. The time series model 464 can be present, utilized, or applied for each of the features extracted from the time series data 462 (e.g., respective time series models associated with respective features, wherein the time series model 464 can comprise the respective time series models). In accordance with various embodiments, the AI component 308 can train the time series model 464 using (e.g., applying or inputting to the time series model 464) the time series data 462, previous time series data from previous collected data (e.g., previous system call data, log data, and/or other data) associated with the node (e.g., 102, 104, 106, 108, or 110), and/or training data (e.g., training data relating to system calls, logs, and/or other operations or processes associated with a node). With regard to each feature, a time series model 464 can predict a next value that should be created (e.g., is expected or projected to be created) by the system for a particular feature during a next time period, based at least in part on analysis of the time series data 462 by the time series model 464 or application of the time series model 464 to the time series data 462. For example, with regard to a write action feature associated with the node (e.g., 102, 104, 106, 108, or 110), the time series model 464 may predict that a particular process may have 30 write actions during the next time period.

The SMC 300 also can comprise a residual component 310 that can determine respective residuals 466 (e.g., residual data, comprising residual vectors and/or values) associated with respective features associated with the node (e.g., 102, 104, 106, 108, or 110) based at least in part on the respective predicted values and respective actual values associated with the respective features with regard to a time period (e.g., the next time period), as indicated at reference numeral 410 of the operational flow process 400. For instance, with regard to each feature, the residual component 310 can compare the predicted value associated with the feature for the next time period to the actual data associated with the feature during the next time period. The residual component 310 can determine and/or generate a residual based at least in part on (e.g., as a function of) the result of the comparison of the predicted value (e.g., relating to predicted behavior) and the actual value (e.g., relating to actual behavior) associated with the feature (e.g., as a function of a difference between the predicted value and the actual value). For example, if the time series model 464 predicted 5 write actions for a particular process during a next time period and 25 write actions actually occurred during the next time period, the residual component 310 can determine the residual for that feature to be 20 (e.g., 25 actual write actions-5 predicted write actions).

In some embodiments, the SMC 300 also can comprise a detector component 312 that can comprise and/or employ a trained behavioral model 468 (e.g., an AI and/or ML-based baseline behavioral model) that can receive (e.g., as input to the behavioral model 468) respective items of residual data associated with the respective features associated with the node (e.g., 102, 104, 106, 108, or 110), and, based at least in part on the analysis by the behavioral model 468 and/or application of the behavioral model 468 to the respective items of residual data (e.g., respective residual vectors and/or values), the detector component 312 and/or the behavioral model 468 can determine, detect, identify, and/or predict whether there is abnormal behavior associated with one or more features (e.g., deviation from normal behavior associated with one or more features) and/or probability or likelihood of attack (e.g., malicious attack) associated with (e.g., by or against) the node, and can generate and provide output data relating or corresponding such determination, detection, identification, and/or prediction of whether there is abnormal behavior and/or the probability or likelihood of attack associated with the node, as indicated at reference numeral 412 of the operational flow process 400.

If, based at least in part on the output data from the behavioral model 468, the detector component 312 determines that a probability (e.g., probability level or value) of an attack associated with the node (e.g., 102, 104, 106, 108, or 110) satisfies (e.g., is at or greater than; meets or exceeds) a defined threshold probability (e.g., defined threshold probability level or value) relating to abnormal behavior associated with a feature(s) associated with the node, the detector component 312 can communicate information relating to the probability being determined to satisfy the defined threshold probability associated with the feature(s) associated with the node to a mitigation component 314 of the SMC 300. The mitigation component 314 can determine and perform, or initiate or facilitate performance of, a mitigation action(s), which can include a corrective and/or remediation action(s), that can be responsive to the attack or threat of attack, in accordance with the defined security management criteria relating to mitigation actions. In some embodiments, the SMC 300 can employ multiple threshold probability levels relating to abnormal behavior, where different mitigation actions can be performed depending in part on which threshold probability level(s) is determined to be satisfied. For instance, the SMC 300 can employ a first (e.g., lower) threshold probability level associated with a feature(s) associated with the node, a second (e.g., relatively higher) threshold probability level associated with the feature(s) associated with the node, and/or one or more other threshold probability levels (e.g., even higher than the second threshold probability level) associated with the feature(s) associated with the node, wherein the mitigation component 314 can perform or facilitate performance of a first mitigation action (e.g., a relatively minor mitigation action, such as sending a notification relating to the threat of attack to a user, a communication device, or a message account) if the first threshold probability level is determined to be satisfied, a second mitigation action (e.g., a more significant mitigation action, such as suspension or termination of a process(es) associated with the feature(s)) if the second threshold probability level is determined to be satisfied, and/or another mitigation action (e.g., termination of the process(es) associated with the feature(s) and an even more stringent mitigation action(s) beyond termination of the process(es)) if the other threshold probability level is determined to be satisfied.

For example, if the output from the behavioral model 468 indicates that the probability of an attack associated with the node (e.g., 102, 104, 106, 108, or 110) satisfies a first defined threshold probability (e.g., a relatively lower threshold probability, such as 5% probability or other relatively lower level), but does not satisfy a second defined threshold probability (e.g., a higher threshold probability, such as 10% probability or other level that is higher than the first defined threshold probability), the detector component 312 can determine that there is abnormal behavior and/or a threat of attack associated with a feature(s) associated with the node, and can communicate such information relating to the probability (e.g., indicating the first threshold is satisfied, but not the second threshold) to the mitigation component 314. In response, the mitigation component 314 can perform or facilitate performance of a first mitigation action (e.g., communicating a notification to the user, administrator, communication device, or message account associated with the user or administrator, and/or performing another desired mitigation action). If, instead, the output from the behavioral model 468 indicates that the probability of an attack associated with the node satisfies the second defined threshold probability, the detector component 312 can determine that there is abnormal behavior and/or a threat of attack (e.g., a relatively higher threat of attack) associated with a feature(s) associated with the node, and can communicate such information relating to the probability (e.g., indicating that the second threshold is satisfied) to the mitigation component 314. In response, the mitigation component 314 can perform or facilitate performance of a second mitigation action (e.g., suspending or terminating a process(es) associated with the feature(s), communicating a notification to the user, administrator, communication device, or message account associated with the user or administrator, and/or performing another desired mitigation action).

If, instead, the output from the behavioral model 468 indicates that the probability of an attack associated with the node does not satisfy the first defined threshold probability or any defined threshold probability, the detector component 312 can determine that no abnormal behavior and/or no threat of attack associated with the node is detected, and/or can communicate such information relating to the very low probability (e.g., indicating the first threshold is not satisfied) to the mitigation component 314. In response, the mitigation component 314 can determine that no mitigation action is to be taken.

In some embodiments, the SMC 300 also can employ respective (e.g., different) threshold probability levels associated with respective types of mitigation actions depending in part on respective features or subgroups of features, and/or other characteristics, associated with the node. For instance, the SMC 300 can employ a first defined threshold probability level or a first subgroup of threshold probability levels with regard to a first feature or first subgroup of features associated with the node, and a second defined threshold probability level or a second subgroup of threshold probability levels with regard to a second feature or second subgroup of features associated with the node.

In certain embodiments, the mitigation actions that can be performed (e.g., by the mitigation component 314 or other component), in response to determining that there is abnormal behavior and/or a threat of attack associated with a feature(s) associated with the node (e.g., 102, 104, 106, 108, or 110), can comprise, for example, monitoring the process(es) or feature(s) associated with the abnormal behavior and/or threat of attack, collecting additional data relating to the abnormal behavior, threat of attack, process(es), feature(s), and/or node, communicating a notification relating to the abnormal behavior and/or threat of attack to the user, the administrator, the communication device, or the message account associated with the user or administrator, suspending or terminating the process(es) associated with the abnormal behavior and/or threat of attack, suspending or terminating all new processes associated with the node, suspending or terminating access to data by the process(es) or feature(s) associated with the abnormal behavior and/or threat of attack, removing the threat from the node or system, requesting a user confirm one or more process activities (e.g., a particular process is attempting to read, write, or delete data associated with the node, confirm that this process is authorized or allowed to proceed) before allowing the process to proceed, request that the user contact an administrator associated with the node or system to confirm process or other activities associated with the node (e.g., before allowing such activities to proceed), isolating the process(es) or data associated with the process(es) that is or are associated with the abnormal behavior and/or threat of attack, isolating the node from other nodes associated with the system, taking the node or process(es) associated with the abnormal behavior and/or threat of attack offline, analyzing information relating to the abnormal behavior and/or threat of attack to facilitate determining whether the threat of attack is an actual attack associated with the node, and/or another desired mitigation, corrective, or remediation action. In certain embodiments, the SMC 300 (e.g., the mitigation component 314 of the SMC 300) can treat a threat of attack (e.g., a divergence or deviation from normal behavior that is determined to be a threat of attack) as an attack associated with the node(s), until (and if) the SMC 300 determines or proves that such threat of attack is not an actual attack.

In some embodiments, in response to determining that there is abnormal behavior and/or a threat of attack associated with a feature(s) associated with the node (e.g., 102, 104, 106, 108, or 110) and/or performance of a mitigation action(s) (e.g., initial mitigation action(s)) in response to the threat of attack, the SMC 300, employing the detector component 312, AI component 308, and/or other component(s) of the SMC 300, can perform further analysis on information relating to the threat of attack, process(es), feature(s), and/or node to facilitate determining whether the threat of attack is an actual attack associated with the feature(s) associated with the node. Such further analysis can comprise analysis on the additional data collected since the threat of attack was detected and/or a more detailed analysis of the previous data and/or additional data associated with the threat of attack. If, based at least in part on the results of such further analysis, the SMC 300 (e.g., the detector component 312) determines that the threat of attack is an actual attack associated with the feature(s) associated with the node, the mitigation component 314 can perform or facilitate performance of one or more other mitigation actions (e.g., more stringent or significant mitigation actions than the initial mitigation action(s) performed in response to identifying the threat of attack) to facilitate mitigating, correcting, or remediating the attack.

If, instead, such further analysis indicates that the threat of attack is not an actual attack associated with the node (e.g., but rather was merely temporary and/or non-malicious abnormal behavior associated with a feature(s) associated with the node), the mitigation component 314 can or may discontinue a mitigation action(s) that had been implemented in response to detecting the threat of attack (e.g., discontinue a suspension of a process, discontinue isolation of the process, discontinue requesting or requiring the user to confirm that a process is authorized or allowed to proceed before allowing the process to proceed, and/or discontinue another mitigation action), and/or communicate a notification to the user, administrator, communication device, or message account associated with the user or administrator to provide notification that the threat of attack has been determined to not be an actual attack associated with the node.

For example, if the output data is indicative of an attack and/or abnormal behavior associated with the node (e.g., 102, 104, 106, 108, or 110), the SMC 300 (e.g., the time series component 306, AI component 308, and/or the detector component 312) can analyze or examine the time series data and/or the residuals and/or time series data to determine which time series vector, residual vector, feature, and/or process (e.g., associated with a process ID) impacted the probability or output data. For instance, if virtually all of the residuals were in size of 0 or relatively close to zero (e.g., indicating normal behavior) and a particular process had a residual of 25, the particular process likely can be a malicious process and likely had a significant impact on the output data from the behavioral model 468. In another example, there may be instances where several processes can create an anomaly (e.g., exhibit abnormal behavior) while each one of those several processes individually only has a relatively small impact on the output data. In this example, the detector component 312, employing the behavioral model 468, can detect the overall impact of the several processes, including detecting the anomaly, based at least in part on the results of analyzing the residual data and/or other data associated with the several processes, even though individually each of those processes only had a relatively small impact on the output data. In response to detecting the anomaly and associated threat of attack, the mitigation component 314 can perform or facilitate performing a desired mitigation action(s), such as described herein.

As another example, consider a process that is attempting to zip files of a node (e.g., a computer). If a zip utility function and associated process typically is being used once a day, the behavior of the process can be 0 write actions per period most of the time. When zip utility function is used, the behavior may be 1 write action per time period. When the malicious process uses the zip utility function, a large number of write actions may be observed (e.g., by the SMC 300) per time period (e.g., 1000 write actions per time period). The SMC 300 can detect such an anomaly associated with the zip utility function and associated process, if and when it occurs, and the mitigation component 314 can perform or facilitate performing a desired mitigation action(s) (e.g., terminate the process or perform another desired mitigation action), in response to the detected anomaly and associated threat of attack.

In some embodiments, the SMC 300 also can learn seasonality associated with a process or feature associated with the node (e.g., 102, 104, 106, 108, or 110). For example, there may be an instance where the malicious zipping process can zip a file per minute. If the seasonality associated with the normal behaving process indicates that files typically can be zipped one per day (e.g., typically there is one file zipped per day), the SMC 300, employing the detector component 312 and behavioral model 468, can detect that a process zipping a file per minute as an anomaly and/or threat of attack, and, in response, the mitigation component 314 can perform or facilitate performing a desired mitigation action(s) (e.g., terminate the process or perform another desired mitigation action).

With further regard to the residual data, in certain embodiments, in addition to each node (e.g., 102, 104, 106, 108, or 110) inputting its respective items of residual data associated with the respective features to its respective trained behavioral model (e.g., behavioral model 468) for analysis, each node (except for, e.g., the CIIS node) can communicate respective residual data (e.g., respective residual vectors and/or values, and/or respective other residual data derived therefrom) to the CIIS node for analysis by the CIIS node (e.g., by the CIIS SMC of the CIIS node), as indicated at reference numeral 414 of the operational flow process 400. The respective residual data associated with the respective features can relate to a particular time period, with regard to one or more time periods. With regard to each node, the residual component (e.g., 310) of the node can format the items of residual data in accordance with a desired format, such as, for example, a Node ID: Process ID: Action format, wherein the Node ID can be a node identifier (e.g., unique or respective node identifier) that can identify the node associated with the item of residual data, the Process ID can identify the process associated with the item of residual data, and the Action can indicate or identify the action(s) and/or provide information relating to the action associated with the item of residual data.

With regard to each node (e.g., 102, 104, 106, 108, and/or 110), while the residual data associated with a feature(s), and associated with the node and/or a user(s) (e.g., one or more users), can relate to the node and/or the user(s) (e.g., one or more users), the residual data (e.g., generation of the residual data by the SMC of the node) desirably (e.g., suitably, enhancedly, or optimally) can anonymize and maintain (e.g., preserve) the privacy of the node-related data and/or user(s)-related data (e.g., the raw node-related data and/or user(s)-related data), including the privacy of node-specific and/or user-specific (e.g., user-identifiable or otherwise user-specific) details of or relating to the node and/or user(s), upon which the residual data can be based and generated. Accordingly, privacy of the node-related data and/or user(s)-related data can be desirably maintained when the SMC of the node communicates the residual data to the CIIS node.

In some embodiments, to facilitate desirably (e.g., suitably, enhancedly, or optimally) reducing or minimizing an amount of data (e.g., residual data) communicated from each node to the CIIS node and/or desirably reducing or minimizing an amount of bandwidth utilized to communicate such data from each node to the CIIS node, with regard to each feature associated with each node (e.g., 102, 104, 106, 108, or 110), the residual component 310 can determine whether any item of residual data (e.g., residual vector or value) associated with any feature and/or associated with any time instance of the time period has a zero residual value with respect to the time period. If the residual component 310 determines that there is one or more items of residual data associated with one or more features (e.g., and/or one or more time instances) that has or have a zero residual value with respect to the time period, the residual component 310 can determine that the one or more items of residual data that has or have the zero residual value can be omitted from the residual data that is communicated to the CIIS node.

If the residual component 310 determines that there is one or more items of residual data associated with one or more features (e.g., and/or one or more time instances) that has or have a non-zero residual value that is associated with (e.g., that is small or low enough to be associated with) normal behavior associated with such feature with respect to the time period, the residual component 310 can determine that the one or more items of residual data (e.g., one or more residual vectors) that has or have the non-zero residual value associated with normal behavior can be replaced with, and accordingly can generate, one or more structured data tables, comprising one or more structured table data (e.g., one or more items of structured table data), that can be representative of the one or more respective items of residual data that has or have the one or more respective non-zero residual values. In certain embodiments, the residual component 310 can associated (e.g., link, map, or otherwise associate) a node ID with the structured table associated with the. In some embodiments, the residual component 310 can determine and generate a structured data table associated with a residual (e.g., a residual vector or other residual) and one or more features in a desired defined structured table format. For instance, the residual component 310 can generate a structured data table associated with a residual and one or more features in a defined structured table format, such as a format that can be defined or structured as {residual: list of features}, although the residual component 310 can utilize another type of structured table format, if and as desired.

For example, with regard to a first residual, associated with a first list of features (e.g., a first list, group, or set comprising one or more features) associated with the node, that is determined to have a non-zero residual value associated with (e.g., indicative of) normal behavior, the residual component 310 of the node can generate a structured table that can comprise information relating to the first residual and the first list of features in the defined structured table format as {first residual: first list of features}; with regard to a second residual, associated with a second list of features (e.g., a second list, group, or set comprising one or more features) associated with the node, that is determined to have a non-zero residual value associated with normal behavior, the residual component 310 can generate a structured table (e.g., as part of the same or a different structured table) that can comprise information relating to the second residual and the second list of features in the defined structured table format as {second residual: second list of features}; and/or with regard to another residual, associated with another list of features (e.g., another list, group, or set comprising one or more features) associated with the node, that is determined to have a non-zero residual value associated with normal behavior, the residual component 310 can generate a structured table (e.g., as part of the same or a different structured table) that can comprise information relating to the other residual and the other list of features in the defined structured table format as {another residual: another list of features}. In accordance with various embodiments, the respective structured table data associated with the respective residuals can be contained in respective structured tables, or can be contained in a structured table that can comprise the respective structured table data associated with the respective residuals and the respective lists of features.

The SMC (e.g., the residual component 310 or other component of each SMC of each node) can communicate the one or more structured data tables, comprising the one or more structured table data (e.g., and/or associated metadata, such as a node ID or other desired metadata), as part of the residual data to the CIIS node in place of and without communicating, to the CIIS node, the one or more respective items of residual data that has or have the one or more respective non-zero residual values determined to be associated with normal behavior. The structured table data can comprise less data (e.g., a lesser amount of data), and can utilize a lower amount of bandwidth to communicate the structured table data, than the one or more items of residual data (e.g., one or more residual vectors) from which the structured table data is derived.

In certain embodiments, to facilitate determining whether one or more items of residual data associated with a feature has or have a non-zero residual value associated with normal behavior, the residual component 310 can receive output data, which can indicate the probability that the one or more items of residual data are associated with abnormal behavior (or alternatively, the probability that the one or more items of residual data are associated with normal behavior (e.g., normal jitter)). Based at least in part on the results of analyzing the one or more items of residual data, the probability that the one or more items of residual data are associated with abnormal (or normal) behavior, one or more applicable defined threshold probability levels, and/or other information relating to such residual data, the residual component 310 can determine whether the one or more respective items of residual data that has or have the one or more respective non-zero residual values is or are associated with normal behavior, and accordingly, can determine whether the one or more respective items of residual data can be replaced with structured table data that can be representative of the one or more respective items of residual data.

Figure 5:
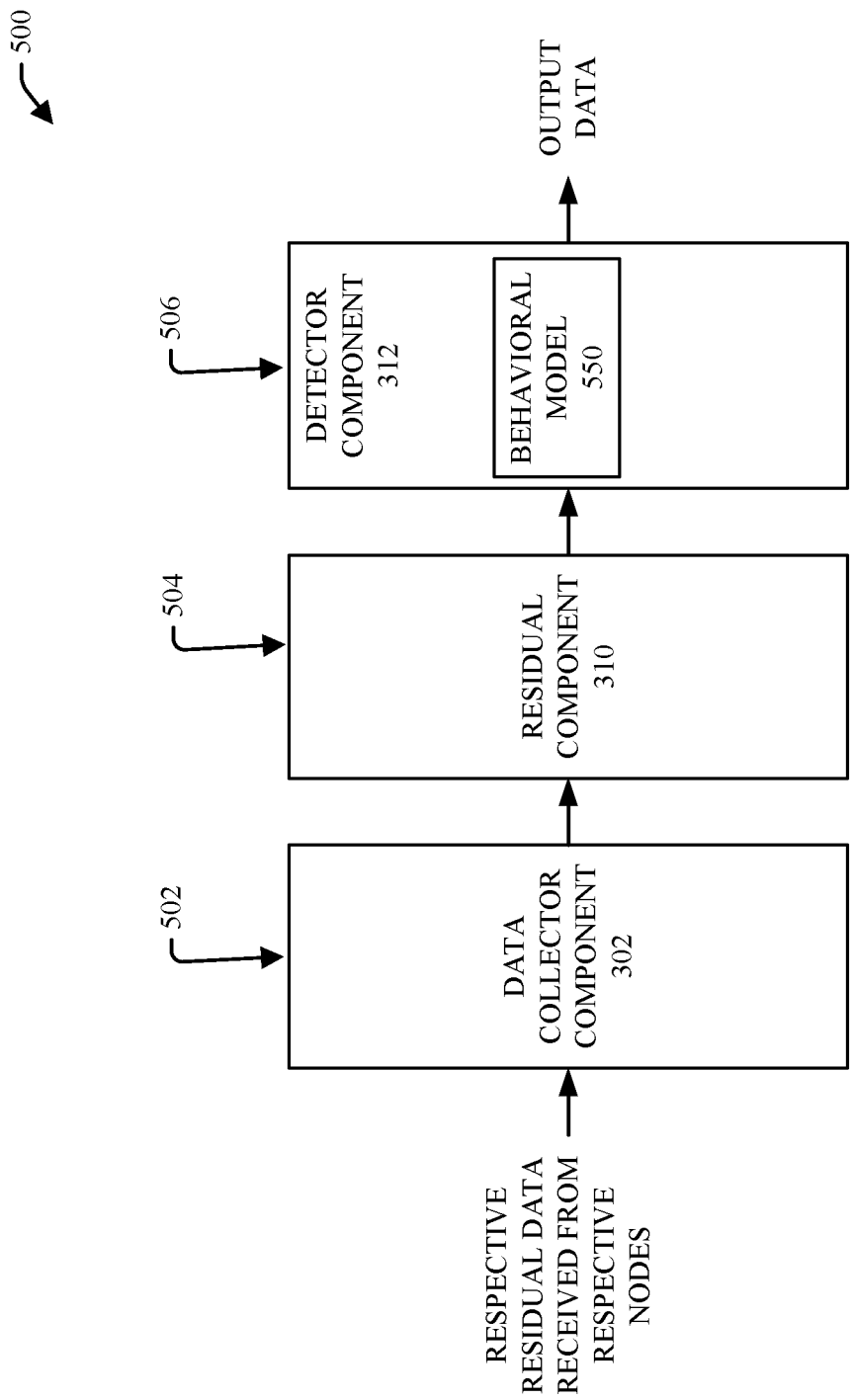
FIG. 5 illustrates a block diagram of a non-limiting example operational flow process 500 that can be performed to detect abnormal behavior associated with a group of nodes, in accordance with various aspects and embodiments of the disclosed subject matter.

Referring to FIG. 5 (along with FIGS. 1-4), FIG. 5 illustrates a block diagram of a non-limiting example operational flow process 500 that can be performed (e.g., by a CIIS SMC of a CIIS node) to detect abnormal behavior associated with a group of nodes, in accordance with the various aspects and embodiments of the disclosed subject matter. The CIIS SMC (e.g., SMC 300 acting as the CIIS SMC) of the CIIS node (e.g., one of the nodes 102, 104, 106, 108, or 110 acting as the CIIS node) can receive respective residual data (e.g., residual vector data and/or residual vector-based data) associated with the respective features from the respective nodes (e.g., 102, 104, 106, 108, and/or 110 (although the CIIS SMC already can have the residual data associated with the CIIS node)), as indicated at reference numeral 502 of the operational flow process 500. In some embodiments, the data collector component (e.g., 302)

of the CIIS SMC can receive, collect, or obtain the respective residual data from the respective nodes.

The residual component (e.g., 310) of the CIIS SMC can determine, generate, reconstruct, and/or otherwise process certain residual data associated with certain respective features, including any zero residual vectors or values associated with certain respective features, based at least in part on the results of analyzing the respective residual data received from the respective nodes (e.g., 102, 104, 106, 108, and/or 110), as indicated at reference numeral 504 of the operational flow process 500. For instance, based at least in part on the results of analyzing the respective residual data received from the respective nodes, there can be instances where the residual component (e.g., 310) of the CIIS SMC can determine that one or more items of residual data (e.g., one or more residual vectors or values) associated with one or more features associated with one or more time instances associated with one or more nodes with respect to the time period are missing or omitted from the respective residual data received from the respective nodes. In response to determining that there are the one or more items of residual data (e.g., one or more residual vectors or values) with respect to the time period that are missing or omitted from the respective residual data, the residual component (e.g., 310) can update (e.g., modify) the respective residual data by inserting (e.g., generating and inserting) one or more respective zero residual vectors or values into the respective residual data received from the respective nodes with respect to the one or more respective features and the one or more respective time instances to replace the one or more items of residual data determined to be missing or omitted from the respective residual data received from the respective nodes.

In certain embodiments, based at least in part on the results of analyzing the respective residual data received from the respective nodes (e.g., 102, 104, 106, 108, and/or 110), there can be instances where the residual component (e.g., 310) of the CIIS SMC (e.g., 300) can determine that the respective residual data can comprise one or more structured data tables, comprising one or more structured table data, that can be representative of one or more respective items of residual data that has or have the one or more respective non-zero residual values that have been determined to be associated with normal behavior with respect to one or more features and/or one or more time instances associated with the time period. If the residual component of the CIIS SMC determines that the structured table data is in a format that can be understood and/or usable by the behavioral model 550 of the CIIS SMC, the residual component of the CIIS SMC can determine that the structured table data can be input into the behavioral model 550 along with the other residual data associated with the nodes (e.g., 102, 104, 106, 108, and/or 110). If, instead, the residual component determines that the structured table data is not in a format that can be understood and/or usable by the behavioral model 550 of the CIIS SMC, the residual component can reconstruct one or more items of residual data (e.g., one or more residual vectors or values) from the structured table data based at least in part on the results of analyzing the structured table data, and the one or more reconstructed items of residual data can be input into the behavioral model 550 along with the other residual data associated with the nodes (e.g., 102, 104, 106, 108, and/or 110).

The detection component (e.g., 312) of the CIIS SMC can comprise and/or employ a trained behavioral model 550 (e.g., an AI and/or ML-based baseline behavioral model) that can receive (e.g., as input to the behavioral model 550) respective items of residual data associated with the respective features associated with the respective nodes (e.g., 102, 104, 106, 108, and/or 110), and, based at least in part on the analysis by the behavioral model 550 and/or application of the behavioral model 550 to the respective items of residual data (e.g., respective residual vectors and/or values, and/or respective other residual data derived therefrom), the detection component (e.g., 312) and/or the behavioral model 550 can determine, detect, identify, and/or predict whether there is abnormal behavior associated with one or more features (e.g., deviation from normal behavior associated with one or more features) associated with one or more nodes of the group of nodes and/or a probability or likelihood of attack (e.g., malicious attack) associated with (e.g., by or against) one or more nodes, as indicated at reference numeral 506 of the operational flow process 500. Significantly and desirably, the detection component of the CIIS SMC can have the capability of detecting abnormal behavior and/or a threat of attack (e.g., under-the-radar attack, zero-day attacks, and/or other type of attack) associated with multiple nodes of the group of nodes, based at least in part on collective analysis of the respective items of residual data across multiple (e.g., all) respective nodes of the group of nodes, even when individual residual data of individual nodes, when analyzed individually (e.g., by an individual node), may not indicate abnormal behavior or a threat of attack associated with that individual node, with regard to each of the nodes.

For example, there may be an instance where a first process and/or a first feature associated with a first node (e.g., 102) is engaging in what appears to be, and/or what is ostensibly, normal (e.g., legitimate and/or non-malicious) behavior, with first non-zero, normal behavior range residual vectors associated with the first process and/or the first feature, and where a second process and/or a second feature associated with a second node (e.g., 104) is engaging in what also appears to be normal behavior, with second non-zero, normal behavior range residual vectors associated with the second process and/or the second feature, but where there is an under-the-radar attack being performed using the first node and the second node. For instance, the first non-zero, normal behavior range residual vectors associated with the first process and/or the first feature (and the first node) may be indicative of normal jitter associated with the first process and/or the first feature that may occur, or can be expected to occur, due to normal fluctuations, or apparently or ostensibly normal fluctuations, associated with the first process and/or the first feature. The SMC of the first node can determine that the first non-zero, normal behavior range residual vectors can be indicative of normal jitter associated with the first process and/or the first feature, for example, if the SMC of the first node determines that the values the first non-zero, normal behavior range residual vectors are within a normal range of values associated with the first process and/or the first feature and/or are not above a defined threshold value (e.g., a first or applicable defined threshold residual vector or value) associated with the first process and/or the first feature, wherein a value above such defined threshold value can be indicative of abnormal behavior associated with the first process and/or the first feature. Similarly, the second non-zero, normal behavior range residual vectors associated with the second process and/or the second feature (and the second node) may be indicative of normal jitter associated with the second process and/or the second feature that may occur, or can be expected to occur, due to normal fluctuations, or apparently or ostensibly normal fluctuations, associated with the second process and/or the second feature. The SMC of the second node can determine that the second non-zero, normal behavior range residual vectors can be indicative of normal jitter associated with the second process and/or the second feature, for example, if the SMC of the second node determines that the values the second non-zero, normal behavior range residual vectors are within a normal range of values associated with the second process and/or the second feature and/or are not above a defined threshold value (e.g., a second or applicable defined threshold residual vector or value) associated with the second process and/or the second feature, wherein a value above such defined threshold value can be indicative of abnormal behavior associated with the second process and/or the second feature.

Since the first process and/or the first feature associated with the first node (e.g., 102) appear to be engaging in normal behavior, the first SMC of the first node may not detect that the first process and/or first feature are part of the under-the-radar attack. Similarly, since the second process and/or the second feature associated with the second node (e.g., 104) appear to be engaging in normal behavior, the second SMC of the second node may not detect that the second process and/or second feature are part of the under-the-radar attack. However, the CIIS SMC of the CIIS node (e.g., 110) can analyze the first residual data (e.g., first non-zero, normal behavior range residual vectors associated with the first process and/or the first feature) associated with the first node and the second residual data (e.g., second non-zero, normal behavior range residual vectors associated with the second process and/or the second feature) associated with the second node, and, based at least in part on the results of such analysis (e.g., by the detection component and/or behavioral model 550 of the CIIS SMC), the CIIS SMC can detect that, collectively, there is abnormal behavior, and/or a threat of attack and/or actual attack, associated with the first process and/or first feature associated with the first node and the second process and/or second feature associated with the second node.

The mitigation component (e.g., 314) of the CIIS SMC, and/or the respective mitigation components of the respective SMCs of the first node and second node, can perform or facilitate performing a desired mitigation action(s) in response to the detected abnormal behavior, and/or threat of attack and/or actual attack, in accordance with the defined security management criteria, such as described herein. The mitigation action(s) can be same as or similar to the mitigation actions described herein. In some embodiments, the mitigation component (e.g., 314) of the CIIS SMC can instruct (e.g., communicate instructions or commands to) the first node (e.g., 102) and/or second node (e.g., 104) to perform a responsive mitigation action(s) or can communicate a notification regarding or relating to the detected abnormal behavior, and/or threat of attack and/or actual attack, to the first node and/or the second node.

In some embodiments, the behavioral model 550 utilized as part of the collective analysis across the group of nodes (e.g., 102, 104, 106, 108, and/or 110) can be same as or similar to the behavioral model 468 employed by each of the nodes individually, except that the behavioral model 550 can be trained in part (e.g., by the AI component 308 of the CIIS SMC) by inputting data (e.g., residual data) associated with the group of nodes into the behavioral model 550, rather than only a single node. In certain embodiments, the CIIS SMC can employ a first behavioral model (e.g., 550) to analyze the respective items of residual data across multiple (e.g., all) respective nodes of the group of nodes, and can employ a second behavioral model (e.g., second trained behavioral model, such as behavioral model 468) to analyze the items of residual data associated with the CIIS node individually. As new data (e.g., new items of residual data) is collected during operation (e.g., ongoing or continuous operation) of the group of nodes, the CIIS SMC (e.g., 300) can process such new data and input the processed data into the behavioral model 550 to further train the behavioral model 550 and/or to have the behavioral model 550 analyze such data to determine whether there is abnormal behavior associated with one or more features associated with one or more nodes of the group of nodes and/or a probability or likelihood of attack associated with (e.g., by or against) one or more nodes. Detecting such deviations from normal behavior can allow attacks, including zero-day attacks, under-the-radar attacks, and/or other types of attacks, to be identified by the CIIS SMC, even when they are not known or are related to newly or recently discovered vulnerabilities.

Similarly, with regard to the behavioral model 468 of a node, as new data (e.g., new items of residual data) is collected during operation (e.g., ongoing or continuous operation) of the node (e.g., 102, 104, 106, 108, or 110), the SMC 300 can process such new data and input the processed data into the behavioral model 468 to further train the behavioral model 468 and/or to have the behavioral model 468 analyze such data to determine whether there is abnormal behavior associated with one or more features associated with the node and/or a probability or likelihood of attack associated with (e.g., by or against) node. Detecting such deviations from normal behavior can allow attacks, including zero-day attacks, under-the-radar attacks, and/or other types of attacks, to be identified by the SMC 300, even when they are not known or are related to newly or recently discovered vulnerabilities.

In certain embodiments, the SMC 300 of each node (e.g., 102, 104, 106, 108, or 110), including the CIIS node, can perform additional training of the models (e.g., time series model 464, behavioral model 468, behavioral model 550, and/or other AI or ML-based model) and/or updating of components (e.g., time series component 306, AI component 308, residual component 310, detector component 312, or other component) to account for legitimate variations or changes in behavior (e.g., system behavior, process behavior, feature behavior, or other behavior) of the nodes and/to account for and mitigate (e.g., reduce or minimize) false positives and/or false negatives with regard to detecting abnormal behavior and/or threats of attack associated with the nodes.

With further regard to the SMC 300, the SMC 300 can comprise a processor component 316 that can work in conjunction with the other components (e.g., data collector component 302, queue component 304, time series component 306, AI component 308, residual component 310, detector component 312, mitigation component 314, data store 318, and/or other component) to facilitate performing the various functions of the SMC 300. The processor component 316 can employ one or more processors (e.g., one or more CPUs), microprocessors, or controllers that can process information relating to data, files, system calls, processes, features, actions, time series data, residuals, models, behavior detection, attacks or threats of attack, threshold levels or values, mitigation actions, notifications, alarms, alerts, operations, operating systems, hardware or virtual platforms, preferences (e.g., user or client preferences), applications, services, hash values, metadata, parameters, traffic flows, policies, defined security management criteria, algorithms (e.g., security management-related algorithms, hash algorithms, data compression algorithms, data decompression algorithms, and/or other algorithm), interfaces, protocols, tools, and/or other information, to facilitate operation of the SMC 300, and control data flow between the SMC 300 and/or other components (e.g., another node or another entity) associated with the SMC 300.

The SMC 300 also can comprise data store 318 that can store data structures (e.g., user data, metadata), code structure(s) (e.g., modules, objects, hashes, classes, procedures) or instructions, information relating to data, files, system calls, processes, features, actions, time series data, residuals, models, behavior detection, attacks or threats of attack, threshold levels or values, mitigation actions, notifications, alarms, alerts, operations, operating systems, hardware or virtual platforms, preferences (e.g., user or client preferences), applications, services, hash values, metadata, parameters, traffic flows, policies, defined security management criteria, algorithms (e.g., security management-related algorithms, hash algorithms, data compression algorithms, data decompression algorithms, and/or other algorithm), interfaces, protocols, tools, and/or other information, to facilitate controlling or performing operations associated with the SMC 300. The data store 318 can comprise volatile and/or non-volatile memory, such as described herein. In an aspect, the processor component 316 can be functionally coupled (e.g., through a memory bus) to the data store 318 in order to store and retrieve information desired to operate and/or confer functionality, at least in part, to the data collector component 302, queue component 304, time series component 306, AI component 308, residual component 310, detector component 312, mitigation component 314, processor component 316, data store 318, and/or other component of the SMC 300, and/or substantially any other operational aspects of the SMC 300.

It should be appreciated that the data store 318 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

With further regard to the AI component 308, in accordance with various embodiments, in connection with or as part of an AI-based or ML-based analysis, the AI component 308 can employ, build (e.g., construct or create), and/or import, AI and/or ML techniques and algorithms, AI and/or ML models (e.g., AI and/or ML-based time series models, behavioral models, and/or other models), neural networks (e.g., trained neural networks), and/or graph mining to render and/or generate predictions, inferences, calculations, prognostications, estimates, derivations, forecasts, detections, and/or computations that can facilitate determining time series data, determining residuals, determining or detecting abnormal behavior, threats of attack, and/or attacks associated with one or more nodes, determining a mitigation action to perform in response to detected abnormal behavior, threats of attack, and/or attacks associated with one or more nodes, and/or automating one or more functions or features of the disclosed subject matter (e.g., automating one or more functions or features of or associated with the SMC 300 or other component of a node(s)).

The AI component 308 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 308 can examine the entirety or a subset of the data (e.g., information relating to system calls, actions, processes, and/or features; time series data; residual data; node-related data; and/or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
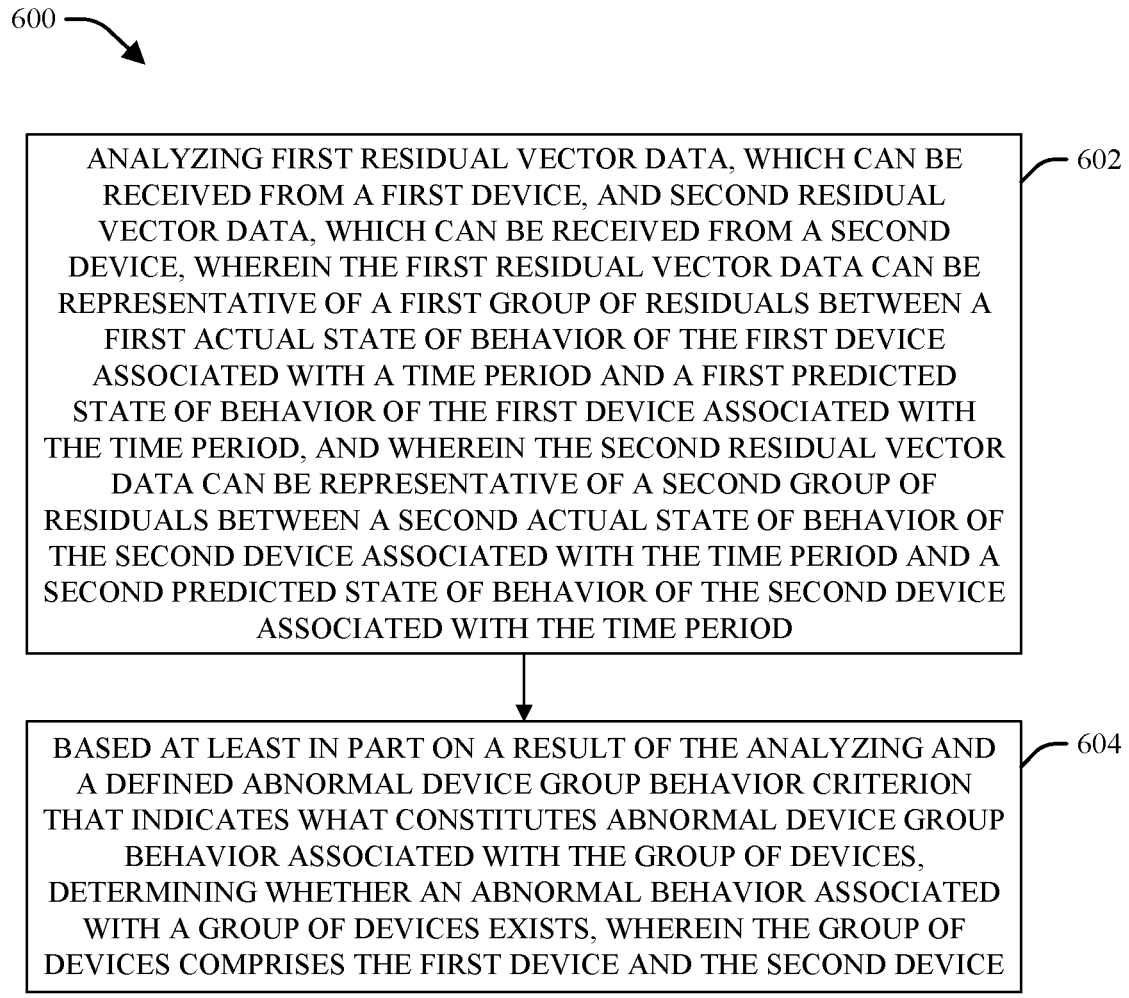
FIG. 6 illustrates a flow chart of an example method that can desirably perform detection of abnormal behavior associated with a group of devices, in accordance with various aspects and embodiments of the disclosed subject matter.

FIG. 6 illustrates a flow chart of an example method 600 that can desirably (e.g., suitably, efficiently, or optimally) perform detection of abnormal behavior associated with a group of devices (e.g., nodes or end point devices), in accordance with various aspects and embodiments of the disclosed subject matter. The method 600 can be employed by, for example, a system comprising the SMC (e.g., CIIS SMC of the CIIS node or device), a processor component (e.g., of or associated with the SMC), and/or data store (e.g., of or associated with the SMC and/or the processor component).

At 602, first residual vector data, which can be received from a first device, and second residual vector data, which can be received from a second device, can be analyzed, wherein the first residual vector data can be representative of a first group of residuals between a first actual state of behavior of the first device associated with a time period and a first predicted state of behavior of the first device associated with the time period, and wherein the second residual vector data can be representative of a second group of residuals between a second actual state of behavior of the second device associated with the time period and a second predicted state of behavior of the second device associated with the time period. The SMC can receive the first residual vector data (e.g., a first group of residual vectors and/or structured table data) from the first device (e.g., first device, node, or UE) and the second residual vector data (e.g., a second group of residual vectors and/or structured table data) from the second device (e.g., second device, node, or UE).

The first residual vector data can comprise respective first residual vectors and/or first structured table data of the first group that can be determined (e.g., by an SMC of the first device) based at least in part on (e.g., as a function of) a difference (e.g., a residual) between first predicted values (e.g., first predicted vectors) associated with respective features for the time period and first actual values (e.g., first actual vectors) associated with the respective features for the time period. The first actual values can be representative of the first actual state of behavior of the first device with regard to the respective features for the time period. The first predicted values can be representative of the first predicted state of behavior of the first device with regard to the respective features for the time period. The first predicted values can be determined (e.g., by the SMC of the first device) based at least in part on first time series data associated with the respective features and a first AI and/or ML-based time series model (e.g., into which the first time series data can be input and analyzed), wherein the first time series data can be determined based at least in part on first system call data relating to system calls associated with the first device during a previous time period.

The second residual vector data can comprise respective second residual vectors and/or second structured table data of the second group that can be determined (e.g., by an SMC of the second device) based at least in part on (e.g., as a function of) a difference between second predicted values (e.g., second predicted vectors) associated with respective features for the time period and second actual values (e.g., second actual vectors) associated with the respective features for the time period. The second actual values can be representative of the second actual state of behavior of the second device with regard to the respective features for the time period. The second predicted values can be representative of the second predicted state of behavior of the second device with regard to the respective features for the time period. The second predicted values can be determined (e.g., by the SMC of the second device) based at least in part on second time series data associated with the respective features and a second AI and/or ML-based time series model (e.g., into which the second time series data can be input and analyzed), wherein the second time series data can be determined based at least in part on second system call data relating to system calls associated with the second device during the previous time period.

The SMC can analyze the first residual vector data and the second residual vector data. In some embodiments, the SMC can employ a trained AI and/or ML model that can be trained to distinguish between normal device group behavior associated with a group of devices and abnormal device group behavior associated with the group of devices. The trained AI and/or ML model can receive the first residual vector data and the second residual vector data as input, can analyze the first residual vector data and the second residual vector data, and/or can learn or identify patterns (e.g., temporal patterns) in the first and second residual vector data, to facilitate determining whether there is abnormal device group behavior associated with the group of devices, such as described herein.

At 604, based at least in part on a result of the analyzing and a defined abnormal device group behavior criterion that indicates what constitutes abnormal device group behavior associated with the group of devices, a determination can be made regarding whether an abnormal behavior associated with a group of devices exists, wherein the group of devices comprises the first device and the second device. The SMC can determine whether an abnormal behavior associated with the group of devices exists based at least in part on the result of the analyzing and the defined abnormal device group behavior criterion. In some embodiments, the trained AI and/or ML model employed by the SMC can provide (e.g., output) a probability or determination regarding whether abnormal behavior associated with the group of devices exists based at least in part on the result of the analyzing and the defined abnormal device group behavior criterion, such as described herein.

Figure 7:
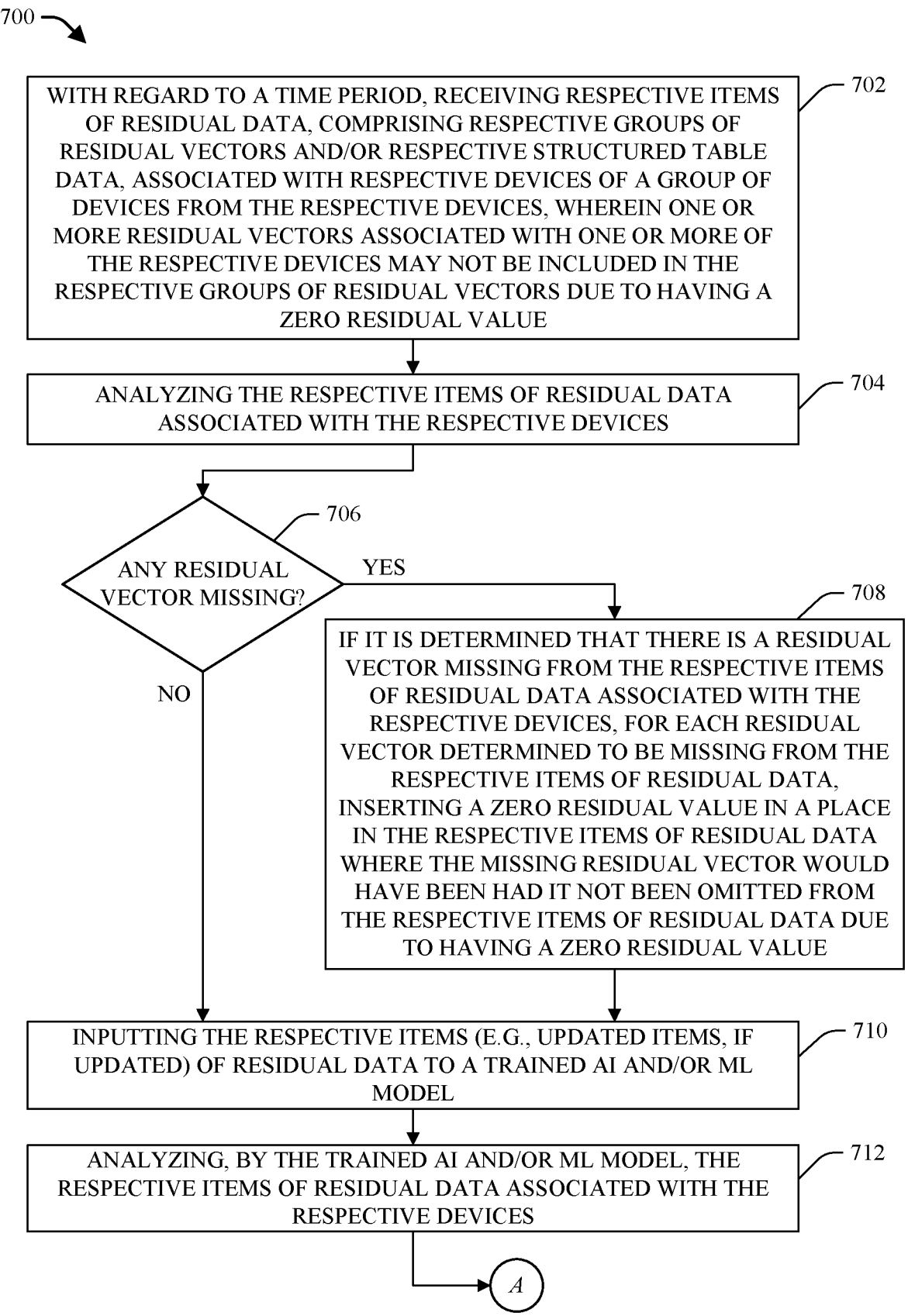
FIGS. 7 and 8 present a flow chart of an example method that can desirably perform and manage detection of abnormal behavior associated with a group of devices, in accordance with various aspects and embodiments of the disclosed subject matter.
Figure 8:
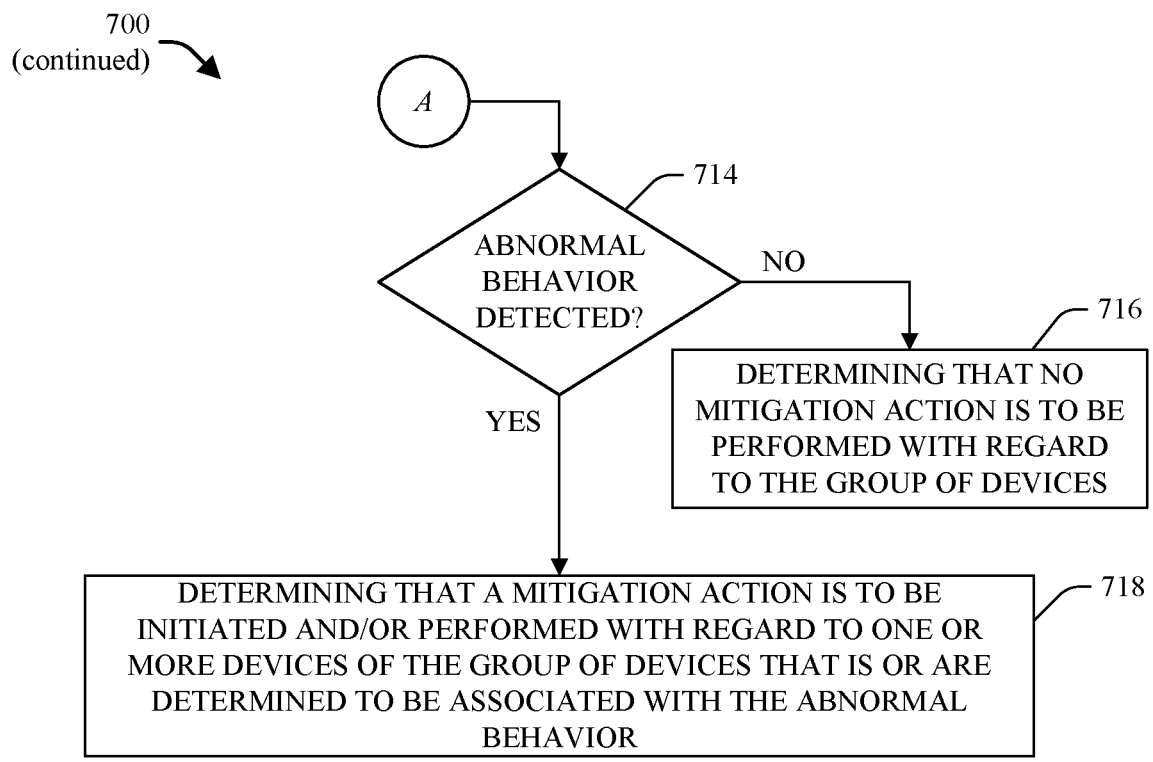

FIGS. 7 and 8 present a flow chart of an example method 700 that can desirably (e.g., suitably, efficiently, or optimally) perform and manage detection of abnormal behavior associated with a group of devices (e.g., a group of nodes or end point devices), in accordance with various aspects and embodiments of the disclosed subject matter. The method 700 can be employed by, for example, a system comprising the SMC, a processor component (e.g., of or associated with the SMC), and/or data store (e.g., of or associated with the SMC and/or the processor component).

At 702, with regard to a time period, respective items of residual data, comprising respective groups of residual vectors and/or respective structured table data, associated with respective devices of a group of devices can be received from the respective devices, wherein one or more residual vectors associated with one or more of the respective devices may not be included in the respective groups of residual vectors due to having a zero residual value (or no residual vectors are not included in (e.g., missing from) the respective groups of residual vectors, if there are no residual vectors having a zero residual value). The devices can be associated with (e.g., connected to and/or communicating via) a communication network. With regard to each device of the group of devices, items of residual data associated with the device can be representative of a group of residuals between an actual state of behavior of the device associated with the time period and a predicted state of behavior of the device associated with the time period. The SMC (e.g., of a device that can be acting as the CIIS node or device of and on behalf of the group of devices) can receive the respective items of residual data, comprising the respective groups of residual vectors and/or the respective structured table data, associated with the respective devices of the group of devices from the respective devices. In some embodiments, the SMC can collect the respective items of residual data in a centralized queue based at least in part on a Device (or Node) ID: Process ID: Action format, such as described herein.

With regard to any structured table data, structured table data, which can be representative of a residual vector(s), can be sent by a device to the SMC in place of sending the actual residual vector(s) due to the residual vector(s) having a value that is determined to be in a normal behavior range (e.g., indicating normal jitter that can be below a threshold amount of jitter associated with or applicable with respect to a feature(s) or attribute(s)), to facilitate reducing or minimizing the amount of data communicated to the SMC, such as described herein. In some instances, one or more residual vectors associated with one or more of the respective devices may not be included in (e.g., can be missing from) the respective groups of residual vectors due to having a zero residual value, such as described herein. In other instances, if none of the residual vectors associated with the respective devices have a zero residual value for that time period, there can be no residual vector that is not included in (e.g., missing from) the respective groups of residual vectors.

At 704, the respective items of residual data associated with the respective devices can be analyzed. The SMC can analyze the respective items of residual data associated with the respective devices.

At 706, a determination can be made regarding whether there is any residual vector that is missing from the respective items of residual data associated with the respective devices, based at least in part on the results of the analysis of the respective items of residual data. The SMC can determine whether there is any residual vector that is missing from any of the respective items of residual data associated with the respective devices, based at least in part on the analysis results. If it is determined that there is a residual vector missing from the respective items of residual data associated with the respective devices, at 708, for each residual vector determined to be missing from the respective items of residual data, a zero residual value can be inserted (e.g., automatically inserted) in a place in the respective items of residual data where the missing residual vector would have been had it not been omitted from the respective items of residual data due to having a zero residual value. For instance, if the SMC determines that there is a residual vector missing from the respective items of residual data associated with the respective devices, for each residual vector determined to be missing from the respective items of residual data, the SMC can insert a zero residual value into the respective items of residual data in the place (e.g., in a temporal or time series location) in the respective items of residual data where the missing residual vector would have been had it not been omitted from the respective items of residual data due to having a zero residual value.

At 710, the respective items of residual data can be input to a trained AI and/or ML model. The SMC can input the respective items of residual data (e.g., if and as updated to include any missing item that has a zero residual vector value) associated with the respective devices into the trained AI and/or ML model (e.g., trained behavioral model), wherein the trained AI and/or ML model can be trained and/or structured such as described herein. The respective items of residual data can include any zero residual values (e.g., zero residual vector values) that the SMC inserted to replace any missing item of residual data (if any item was determined to be missing), and/or can include any structured table data relating to a residual vector(s), and/or can include any residual vector(s) reconstructed (e.g., by the SMC) from the respective structured table data that had replaced the residual vector(s).

Referring again to reference numeral 706, if, instead, it is determined that there is no residual vector missing from the respective items of residual data associated with the respective devices, the method 700 can proceed to reference numeral 710, wherein the respective items of residual data can be input to the trained AI and/or ML model (e.g., trained behavioral model), and the method 700 can continue from that point. For instance, if the SMC determines that there is no residual vector missing from the respective items of residual data associated with the respective devices, the SMC can input the respective items of residual data to the trained AI and/or ML model, such as described herein.

At 712, the respective items of residual data associated with the respective devices can be analyzed by the trained AI and/or ML model. The trained AI and/or ML model, employed by the SMC, can analyze (e.g., can perform an AI and/or ML-based analysis on) the respective items of residual data associated with the respective devices. In some embodiments, the method 700 can continue to reference point A, wherein the method 700 can proceed from reference point A, as depicted in FIG. 8, such as described herein.

At 714, based at least in part on the result of the analysis of the respective items of residual data by the trained AI and/or ML model and a defined abnormal device group behavior criterion that indicates what constitutes abnormal device group behavior associated with the group of devices, a determination can be made regarding whether an abnormal behavior associated with the group of devices exists. The trained AI and/or ML model or the SMC can determine whether an abnormal behavior associated with the group of devices exists based at least in part on the result of the analysis of the respective items of residual data by the trained AI and/or ML model and the defined abnormal device group behavior criterion. In some embodiments, the trained AI and/or ML model can provide a probability or determination regarding whether abnormal behavior associated with the group of devices exists based at least in part on the result of such analysis and the defined abnormal device group behavior criterion, such as described herein.

If it is determined that abnormal behavior associated with the group of devices does not exist (e.g., has not been detected) based at least in part on the analysis result of the analysis by the trained AI and/or ML model and the defined abnormal device group behavior criterion, at 716, a determination can be made that no mitigation action is to be performed with regard to the group of devices. For instance, if the SMC determines that abnormal behavior associated with the group of devices has not been detected based at least in part on the analysis result and the defined abnormal device group behavior criterion, the SMC can determine that no mitigation action (e.g., suspension or termination of a process) is to be performed with regard to the group of devices.

Referring again to reference numeral 714, if, instead, it is determined that that abnormal behavior associated with the group of devices exists (e.g., has been detected) based at least in part on the analysis result and the defined abnormal device group behavior criterion, at 718, a determination can be made that a mitigation action can be initiated and/or performed with regard to one or more devices of the group of devices that is or are determined to be associated with the abnormal behavior. If the SMC determines that abnormal behavior associated with the group of devices is detected based at least in part on the analysis result and the defined abnormal device group behavior criterion, the SMC can determine that a mitigation action (e.g., a temporary or permanent mitigation action) can be initiated and/or performed with regard to the one or more devices (e.g., until a determination can be made regarding whether the abnormal behavior is an actual malicious or otherwise undesired threat against the one or more devices and/or the communication network).

For instance, the trained AI and/or ML model or the SMC can determine, identify, or detect that there is abnormal behavior associated with the one or more devices based at least in part on determining that there is a deviation from normal behavior (e.g., normal device group behavior) associated with the one or more devices, wherein the determining that there is such deviation can be based at least in part on the analysis result and the defined abnormal device group behavior criterion (e.g., satisfaction of the defined abnormal device group behavior criterion or corresponding abnormal device group behavior condition, which can indicate that there is abnormal behavior associated with the one or more devices of the group of devices). In response to determining, identifying, or detecting that there is abnormal behavior associated with the one or more devices, the SMC can determine that the mitigation action is to be initiated and/or performed with regard to the one or more devices. The mitigation action can comprise a suspension or termination of at least one process, and/or another desired mitigation action(s), associated with the one or more devices of the group of devices that is or are determined to be engaging in or experiencing the abnormal behavior, such as described herein. The mitigation action can be temporary or permanent, in accordance with (e.g., as indicated or specified by) the defined security management criteria, such as described herein. For example, the SMC can suspend or initiate suspension of at least one process, and/or perform or initiate performance of another desired mitigation action (e.g., temporary or permanent mitigation action), associated with at least one device of the group of devices that is determined to be associated with (e.g., engaging in, experiencing, or exhibiting) the abnormal behavior at least until the SMC can determine whether the abnormal behavior is an actual malicious or otherwise undesired threat against the communication network.

Figure 9:
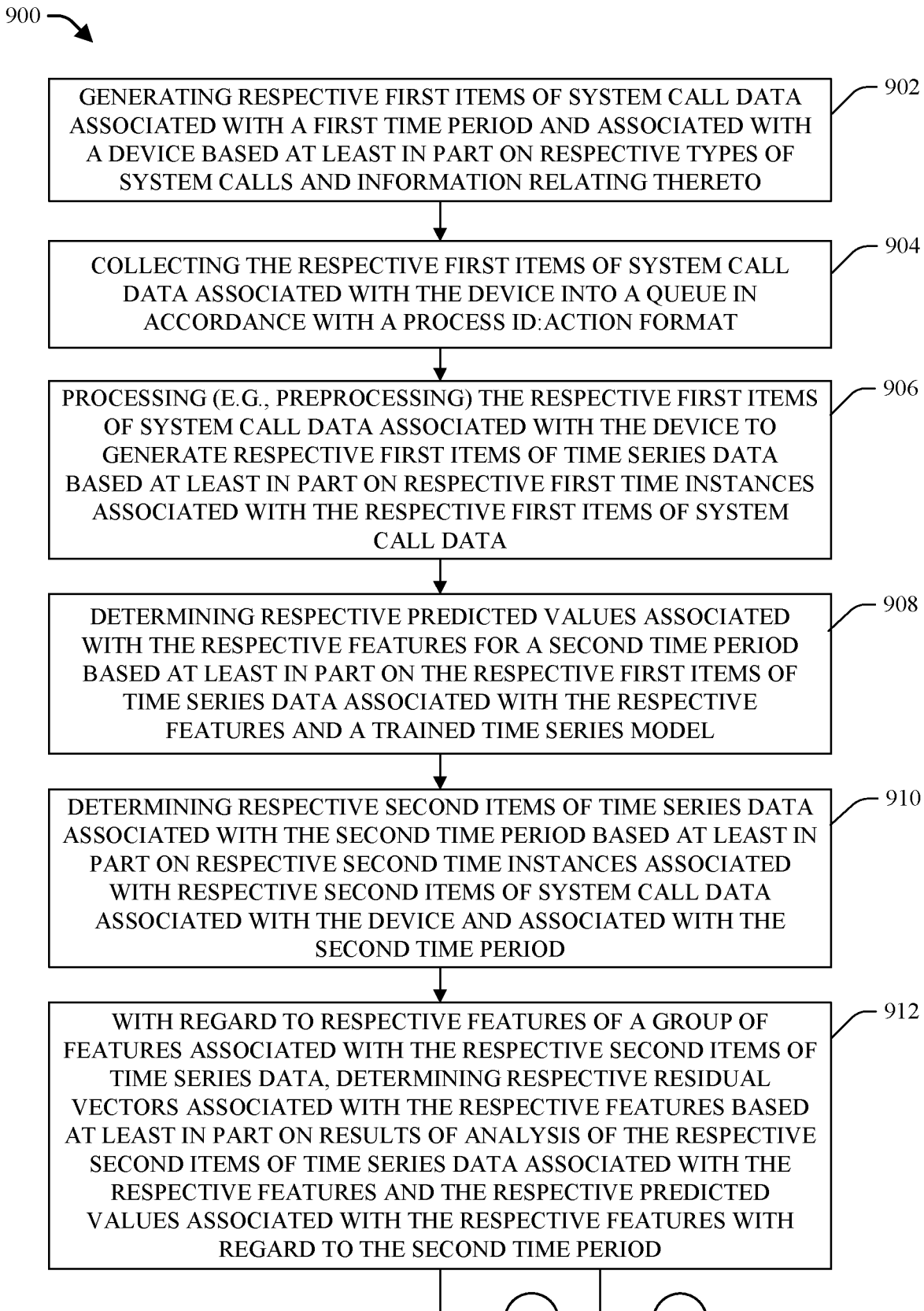
FIGS. 9 and 10 depict a flow chart of an example method that can desirably perform and manage detection of abnormal behavior associated with a device, in accordance with various aspects and embodiments of the disclosed subject matter.
Figure 10:
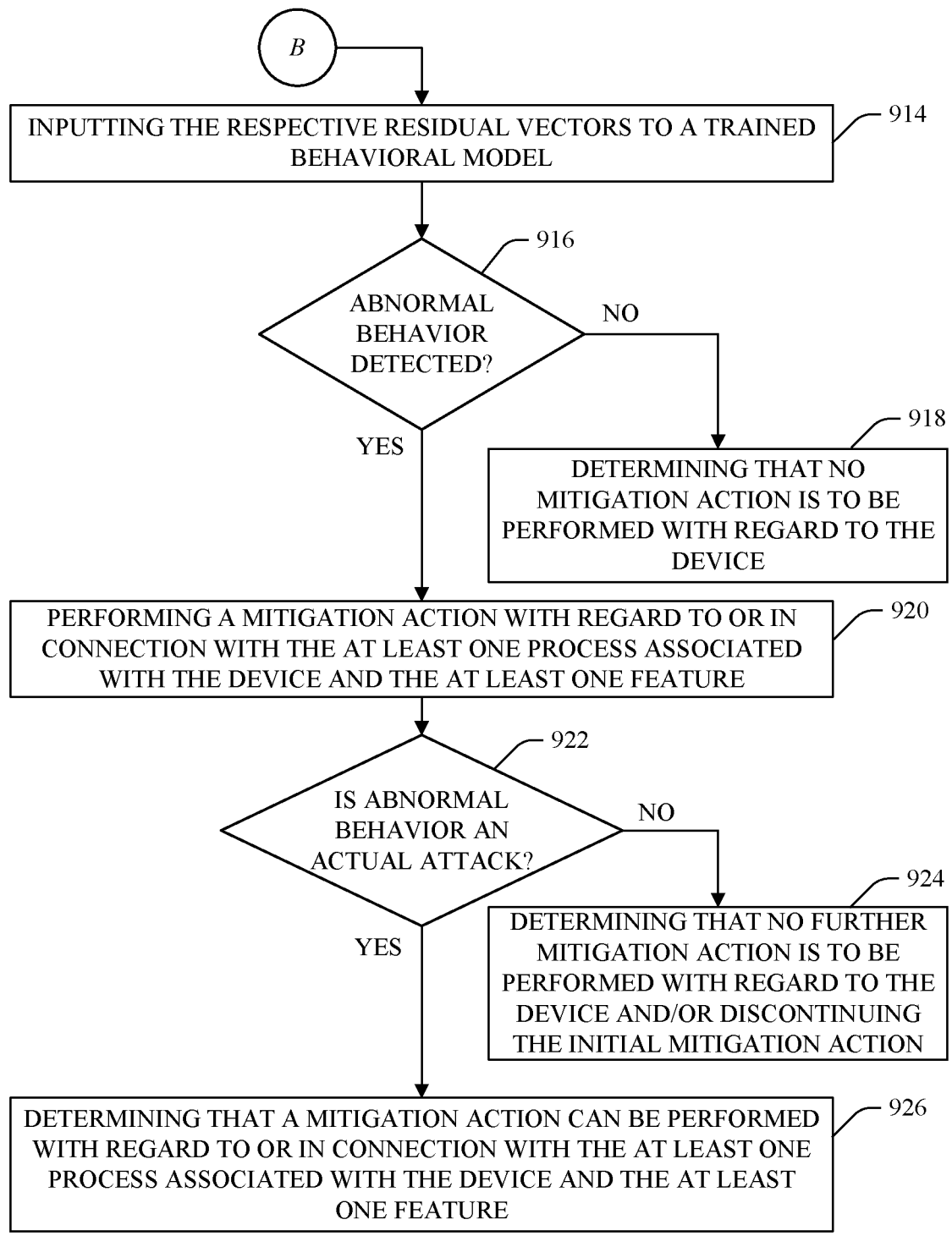

FIGS. 9 and 10 depict a flow chart of an example method 900 that can desirably (e.g., suitably, efficiently, or optimally) perform and manage detection of abnormal behavior associated with a device (e.g., a node or end point device), in accordance with various aspects and embodiments of the disclosed subject matter. The method 900 can be employed by, for example, a system comprising the SMC (e.g., SMC of a device), a processor component (e.g., of or associated with the SMC), and/or data store (e.g., of or associated with the SMC and/or the processor component).

At 902, respective first items of system call data associated with a first time period and associated with a device can be generated based at least in part on respective types of system calls and information relating thereto. With regard to each device of a group of devices, the SMC of the device can generate the respective first items of system call data associated with the first time period (e.g., most recent time period or other previous time period) based at least in part on the respective types of system calls (e.g., process control, device management, file management, communication, information maintenance, or other type of system call) and the information relating thereto.

At 904, the respective first items of system call data associated with the device can be collected into a queue in accordance with a Process ID: Action format. The SMC of the device can collect the respective first items of system call data associated with the device into a queue (e.g., centralized queue of the device) in accordance with the Process ID: Action format (e.g., actions per process ID), such as described herein.

At 906, the respective first items of system call data associated with the device can be processed (e.g., preprocessed) to generate respective first items of time series data based at least in part on respective first time instances associated with the respective first items of system call data. The SMC of the device can process the respective first items of system call data associated with the device to generate the respective first items of time series data (e.g., respective item of continuous and/or sequential time series data) based at least in part on the respective first time instances associated with the respective first items of system call data (e.g., respective first time instances of occurrence of the respective system calls represented in the respective first items of system call data). For instance, the SMC can arrange or organize the respective first items of system call data into a desired order (e.g., continuous and/or sequential order in time) to generate the respective first items of time series data based at least in part on the respective first time instances and/or respective features associated with the respective first items of system call data. In some embodiments, as part of analysis and processing of the respective first items of system call data, the SMC can determine respective first vectors (e.g., first numerical vectors) associated with respective features for the respective first items of time series data that can correspond to or can be representative of the respective first items of system call data (e.g., the SMC can translate or convert an item of system call data to a corresponding or representative vector).

At 908, respective predicted values associated with the respective features for a second time period can be determined based at least in part on the respective first items of time series data associated with the respective features and a trained time series model. The SMC of the device can input the respective first items of time series data associated with the respective features into the trained time series model (e.g., a trained AI and/or ML-based time series model), and apply the trained time series model to the respective first items of time series data associated with the respective features. Based at least in part on the applying of the trained time series model to the respective first items of time series data associated with the respective features, the trained time series model of the SMC can determine respective predicted values (e.g., respective predicted vectors) associated with the respective features with regard to the second time period (e.g., a next, subsequent, or future time period). A predicted value associated with a feature can be, for example, a next value associated with a particular feature that is predicted or expected to be generated by the device or system with regard to the particular feature during the second time period. In some embodiments, the trained time series model can be trained based on applying or inputting time series data (e.g., previous items of time series data and/or current items of time series data) to a time series model to train it to form the trained time series model.

At 910, respective second items of time series data associated with the second time period can be determined based at least in part on respective second time instances associated with respective second items of system call data associated with the device and associated with the second time period. The SMC of the device can process the respective second items of system call data associated with the device to determine and generate the respective second items of time series data based at least in part on the respective second time instances associated with the respective second items of system call data. In some embodiments, as part of analysis and processing of the respective second items of system call data, the SMC can determine respective second vectors (e.g., second numerical vectors) associated with respective features for the respective second items of time series data that can correspond to or can be representative of the respective second items of system call data.

At 912, with regard to respective features of a group of features associated with (e.g., represented in) the respective second items of time series data, respective residual vectors associated with the respective features can be determined based at least in part on results of analysis of the respective second items of time series data associated with the respective features and the respective predicted values associated with the respective features with regard to the second time period. The SMC of the device can determine the respective residual vectors associated with the respective features based at least in part on results of analysis (e.g., comparison) of the respective second items of time series data (e.g., respective second vectors or values corresponding thereto or representative thereof) associated with the respective features and the respective predicted values (e.g., predicted vectors) associated with the respective features. For example, with regard to each item of time series data associated with a feature, the SMC can compare the value or vector representative of the item of time series data associated with the feature to the corresponding predicted value or vector associated with the feature, and, based at least in part on the result of the comparison, can determine the residual vector as, or as a function of, a difference between the value or vector representative of the item of time series data and the predicted value or vector. In accordance with various embodiments, the method 900 can continue reference point B, wherein method 900 can proceed from reference point B to reference numeral 914 and can proceed from that point, as depicted in FIG. 10, and/or the method 900 can continue to reference point C, wherein method 1100 of FIG. 11 can proceed from reference point C, such as described herein.

At 914, the respective residual vectors can be input to a trained behavioral model. The SMC can input or apply the respective individual residual vectors associated with the respective features to the trained behavioral model (e.g., trained AI and/or ML-based system baseline behavioral model). The trained behavioral model can be trained to distinguish between normal device behavior and abnormal device behavior, such as described herein.

At 916, based at least in part on the results of analysis of the respective residual vectors by to the trained behavioral model, a determination can be made regarding whether the device is exhibiting abnormal behavior, in accordance with the defined security management criteria. For instance, based at least in part on the application of the trained behavioral model to the respective residual vectors input to such model and the results of analysis of the respective residual vectors by to the trained behavioral model, the trained behavioral model of the SMC can provide an output (e.g., output data or output probability data) that can indicate a probability that the device is exhibiting abnormal behavior with regard to one or more features, in accordance with the defined security management criteria, which can include defined abnormal device behavior criteria that can indicate what constitutes abnormal device behavior (or conversely, defined normal device behavior that can indicate what constitutes normal device behavior). The SMC can determine whether the device is exhibiting abnormal behavior (e.g., associated with at least one feature) or normal behavior based at least in part on the output data provided by the trained behavioral model.

If it is determined that the device is not exhibiting abnormal device behavior, at 918, a determination can be made that no mitigation action is to be performed with regard to the device. For example, in response to the SMC of the device determining that the device is not exhibiting abnormal device behavior (e.g., the processes associated with the device are determined to be behaving normally and are not deviating from normal behavior), the SMC can determine that no mitigation action is to be performed with regard to the device.

If, instead, it is determined, at 916, that the device is exhibiting abnormal device behavior, which can indicate that at least one process associated with the device and at least one feature may be engaging in an attack on the device and/or the communication network, at 920, a mitigation action can be performed with regard to or in connection with the at least one process associated with the device and the at least one feature. For instance, in response to the SMC of the device determining that the device (e.g., a process(es) associated with the device) is exhibiting abnormal device behavior, the SMC can perform a mitigation action (e.g., initial or preliminary mitigation action) with regard to or in connection with the at least one process associated with the device and the at least one feature. The SMC can determine the mitigation action that is to be performed based at least in part on the type of threat of attack, the level or severity of the threat of attack, the probability level associated with the threat of attack, and/or other factors, such as described herein.

At 922, a determination can be made regarding whether the abnormal device behavior of the device is an actual attack against the communication network, based at least in part on the results of further analysis of data (e.g., residual vectors and/or other data) associated with the device and/or applying of a trained AI and/or ML-based model (e.g., the trained AI and/or ML-based system baseline behavioral model or another trained AI and/or ML-based model of the SMC). For instance, the SMC of the device can determine whether the abnormal device behavior of the device is an actual attack against the communication network or instead a false positive indicator of an attack against the communication network, based at least in part on the results of the further analysis of data associated with the device and/or applying of the trained AI and/or ML-based model.

If it is determined that the abnormal device behavior is not an actual attack against the communication network based at least in part on the results of the further analysis of data, at 924, a determination can be made that no further mitigation action is to be performed with regard to the device and/or the initial mitigation action can be discontinued. For instance, if, based at least in part on the results of the further analysis of data, the SMC of the device determines that the abnormal device behavior is not an actual attack by the device against the communication network, the SMC can determine that no further mitigation action is to be performed and/or the initial mitigation action can be discontinued.

If, instead, at 922, it is determined that the abnormal device behavior is an actual attack against the communication network based at least in part on the results of the further analysis of data, at 926, a determination can be made that a mitigation action can be performed with regard to or in connection with the at least one process associated with the device and the at least one feature. For instance, if, based at least in part on the results of the further analysis of data, the SMC of the device determines that the abnormal device behavior is an actual attack by the device against the communication network, the SMC can determine that the mitigation action (e.g., further mitigation action) can be performed with regard to or in connection with the at least one process associated with the device and the at least one feature, in accordance with the defined security management criteria. The mitigation action can comprise, for example, terminating the at least one process, isolating the at least one process from other processes and/or data of or associated with the device, isolating the device from other devices and/or the communication network, sidelining data associated with the at least one process or the device, terminating access to data of the device by the at least one process, terminating access to data of the communication network by the device, notifying an administrator regarding the attack by the device, monitoring or tracking activity by the device, and/or other desired mitigation action with respect to the device or the communication network, in accordance with (e.g., as specified or indicated by) the defined security management criteria, such as described herein.

Figure 11:
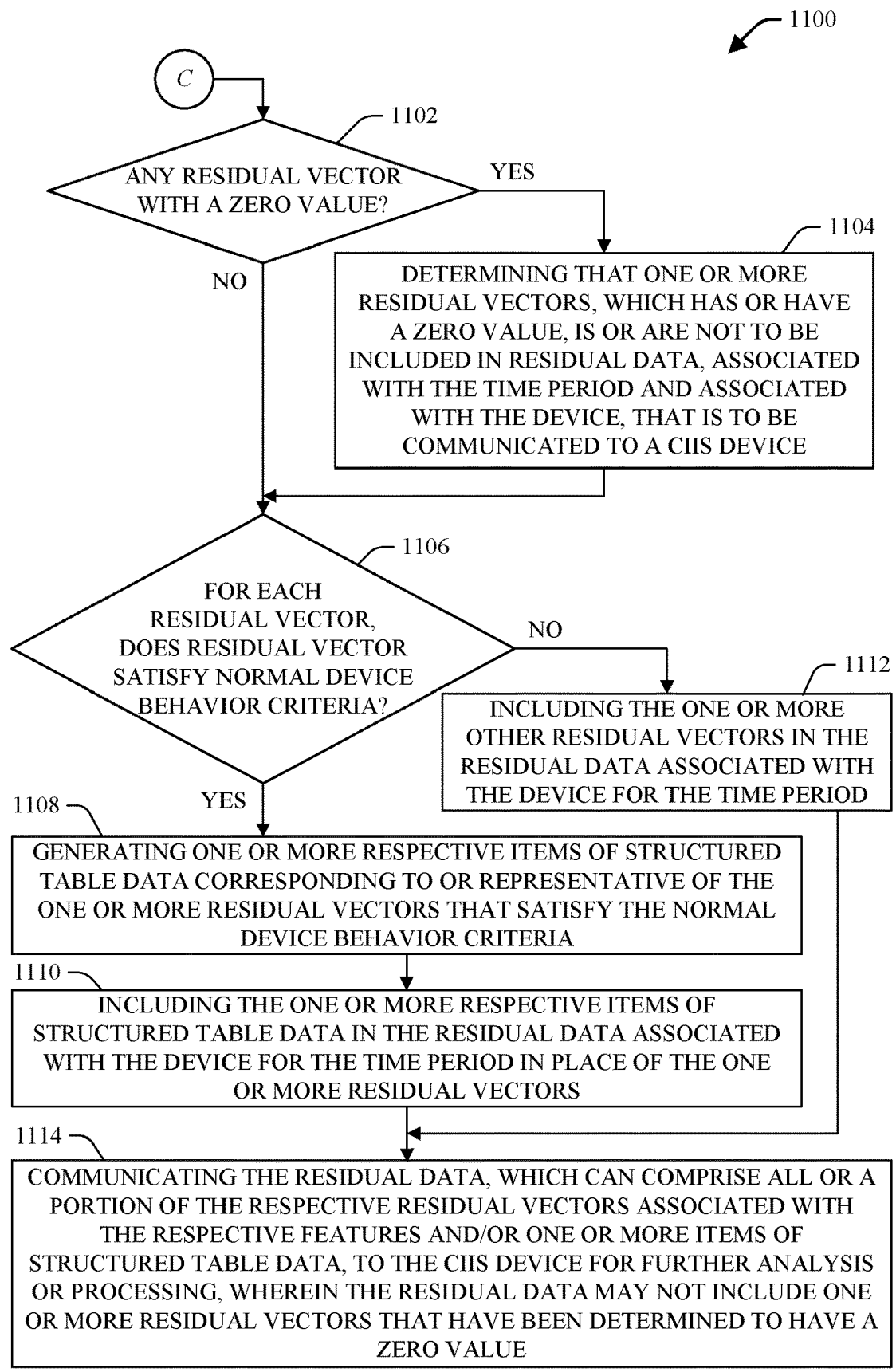
FIG. 11 depicts a flow chart of another example method that can desirably generate residual data associated with a device and communicate such residual data to a collective intelligence immunity system (CIIS) device for further processing and analysis to facilitate performing and managing detection of abnormal behavior associated with one or more devices of a group of devices, in accordance with various aspects and embodiments of the disclosed subject matter.

FIG. 11 depicts a flow chart of another example method 1100 that can desirably (e.g., suitably, efficiently, or optimally) generate residual data associated with a device and communicate such residual data to a CIIS device for further processing and analysis to facilitate performing and managing detection of abnormal behavior associated with one or more devices of a group of devices, in accordance with various aspects and embodiments of the disclosed subject matter. The method 1100 can be employed by, for example, a system comprising the SMC (e.g., SMC of the device), a processor component (e.g., of or associated with the SMC), and/or data store (e.g., of or associated with the SMC and/or the processor component). In some embodiments, the method 1100 can proceed from reference point C of the method 900 of FIGS. 9 and 10.

At 1102, a determination can be made regarding whether any residual vector of the respective residual vectors associated with the respective features and associated with the device has a zero value, based at least in part on the results of analyzing the respective residual vectors. The SMC of the device can analyze the respective residual vectors associated with the time period, and, based at least in part on the analysis results, the SMC can determine whether any residual vector of the respective residual vectors associated with the device has a zero value.

If it is determined that one or more residual vectors associated with the device has or have a zero value, at 1104, a determination can be made that the one or more residual vectors is or are not to be included in residual data, associated with the time period and associated with the device, that is to be communicated to a CIIS device. If, based at least in part on the analysis results, the SMC determines that one or more residual vectors associated with the device has or have a zero value, the SMC can determine that the one or more residual vectors with the zero value is or are not to be included in the residual data, associated with the time period and associated with the device, that is to be communicated to the CIIS device. From reference numeral 1104, the method 1100 can proceed to reference numeral 1106.

If, instead, at reference numeral 1102, it is determined that none of the residual vectors associated with the device has a zero value, at 1104, the method 1100 can proceed to reference numeral 1106. If, based at least in part on the analysis results, the SMC determines that none of the residual vectors associated with the device has a zero value (e.g., with regard to the residual vectors associated with the time period), the method 1100 can proceed to reference numeral 1106 (e.g., the SMC can determine that none of the residual vectors is to be completely removed from the residual data).

At 1106, a determination can be made regarding whether any residual vector of the respective residual vectors associated with the respective features and associated with the device has a value (e.g., a non-zero value) that satisfies defined normal device behavior criteria. The SMC of the device can determine whether any residual vector of the respective residual vectors associated with the respective features and associated with the device has a value (e.g., a non-zero value) that satisfies defined normal device behavior criteria (e.g., that has a value that is less than or equal to a threshold value, above which indicates abnormal device behavior, and at or below which indicates normal device behavior).

If it is determined that one or more residual vectors of the respective residual vectors has a value or have values that satisfy the defined normal device behavior criteria, at 1108, for the one or more residual vectors, one or more respective items of structured table data corresponding to or representative of the one or more residual vectors can be generated. If the SMC of the device determines that one or more residual vectors of the respective residual vectors have one or more respective values that satisfy the defined normal device behavior criteria, with regard to the one or more residual vectors, the SMC can generate the one or more respective items of structured table data corresponding to or representative of the one or more residual vectors, such as described herein.

At 1110, the one or more respective items of structured table data corresponding to or representative of the one or more residual vectors that satisfy the defined normal device behavior criteria can be included in the residual data associated with the device for the time period in place of the one or more residual vectors. The SMC can include or insert the respective items of structured table data corresponding to or representative of the one or more residual vectors that satisfy the defined normal device behavior criteria in the residual data in place of the one or more residual vectors. From reference numeral 1110, the method 1100 can proceed to reference numeral 1114.

Referring again to reference numeral 1106, if, at reference numeral 1106, it is determined that one or more other residual vectors of the respective residual vectors has or have a value that does not satisfy the defined normal device behavior, at 1112, the one or more other residual vectors can be included in the residual data associated with the device for the time period. If the SMC determines that one or more other residual vectors of the respective residual vectors has or have a value that does not satisfy the defined normal device behavior, the SMC can include or insert the one or more other vectors in the residual data associated with the device for the time period. From reference numeral 1112, the method 1100 can proceed to reference numeral 1114.

At 1114, the residual data, which can comprise all or a portion of the respective residual vectors associated with the respective features and/or one or more items of structured table data (in place of one or more residual vectors), can be communicated to the CIIS device for further analysis or processing, wherein the residual data may not include one or more residual vectors that have been determined to have a zero value. The SMC of the device can communicate the residual data, which can comprise all or a portion of the respective residual vectors associated with the respective features and/or one or more items of structured table data (in place of one or more residual vectors), to the CIIS device (e.g., the SMC of the CIIS node) for further analysis or processing. The residual data may not include one or more residual vectors (if any) that have been determined to have a zero value.

Figure 12:
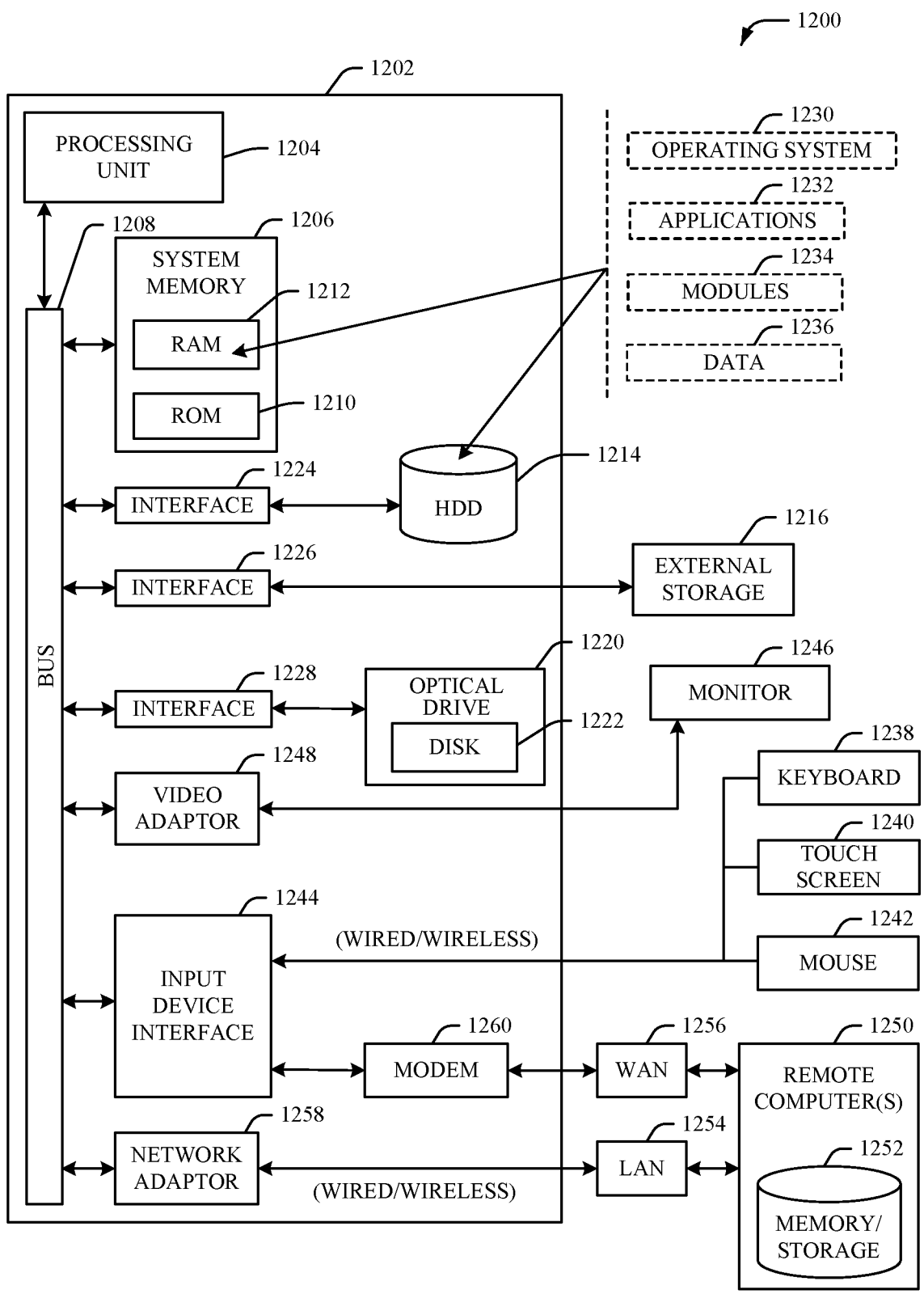
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., node, device, communication network, security management component (SMC), model, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising at least one processor, first residual vector data received from a first device and second residual vector data received from a second device, wherein the first residual vector data is representative of a first group of residuals between a first actual state of behavior of the first device determined to have occurred during a time period and a first predicted state of behavior of the first device that was expected to occur during the time period, and wherein the second residual vector data is representative of a second group of residuals between a second actual state of behavior of the second device determined to have occurred during the time period and a second predicted state of behavior of the second device that was expected to occur during the time period; and
based on a result of the analyzing and a defined abnormal device group behavior criterion that indicates what constitutes abnormal device group behavior associated with the group of devices, determining, by the system, whether an abnormal behavior associated with a group of devices exists, wherein the group of devices comprises the first device and the second device.

2. The method of claim 1, wherein respective residuals of the first group of residuals relate to respective features associated with the first device.

3. The method of claim 1, further comprising:
based on the result of the analyzing indicating that the abnormal behavior associated with the group of devices exists, determining, by the system, that the abnormal behavior associated with the group of devices exists, wherein the result indicates that there is a deviation from a normal device group behavior associated with the group of devices; and
in response to determining that the abnormal behavior associated with the group of devices exists, initiating, by the system, termination of at least one process associated with a security threat indicated by the abnormal behavior.

4. The method of claim 3, wherein the result is a first result, and wherein the method further comprises:
based on the first result of the analyzing, determining, by the system, that the abnormal behavior is the security threat to network equipment of a communication network; and
based on a second result of the analyzing, determining, by the system, whether the abnormal behavior associated with the group of devices is an actual malicious attack on the network equipment of the communication network by at least some devices, comprising the first device and the second device, of the group of devices.

5. The method of claim 1, further comprising:
learning, by a machine learning model of the system, to distinguish between normal behavior associated with the group of devices and the abnormal behavior associated with the group of devices based on inputting, into the machine learning model, residual vector data that indicates normal device behavior or normal device group behavior of one or more devices.

6. The method of claim 5, further comprising:
learning, by the system, temporal patterns associated with respective devices, comprising the first device and the second device, of the group of devices based on application of respective residual vector data associated with the respective devices to the machine learning model to facilitate the analyzing, wherein the respective residual vector data comprises the first residual vector data and the second residual vector data, and
wherein the determining whether the abnormal behavior associated with the group of devices exists comprises determining whether the abnormal behavior associated with the group of devices exists based on the temporal patterns associated with the respective devices and the defined abnormal device group behavior criterion.

7. The method of claim 1, wherein the first residual vector data comprises structured table data relating to a group of features associated with at least one residual of the first group of residuals associated with the first device that indicates the first device satisfies a defined normal behavior criterion with respect to at least one time instance associated with at least the one residual, wherein the structured table data is indicative of residual vectors represented in a portion of the first residual vector data, and wherein the residual vectors are representative of some residuals of the first group of residuals.

8. The method of claim 7, wherein the structured table data contains a first amount of data that is less data than a second amount of data of the residual vectors to facilitate reducing a third amount of data, comprising the first amount of data, received from the group of devices via network equipment of a communication network.

9. The method of claim 1, further comprising:
determining, by the system, that initial first residual vector data associated with the first device does not contain an item of residual vector data associated with a time instance of the time period, wherein the determining that the initial first residual vector data does not contain the item of residual vector data associated with the time instance indicates that the item of residual vector data has a zero value and the first device satisfies a defined normal device behavior criterion during the time instance; and
inserting, by the system, a vector value of zero, with regard to the time instance, in the initial first residual vector data to generate the first residual vector data, to facilitate filling in the item of residual vector data missing from the initial first residual vector data.

10. The method of claim 1, wherein at least a portion of the first residual vector data relates to device-related data related to the first device and user-related data related to a user associated with the first device, and wherein the first residual vector data anonymizes and maintains privacy of the device-related data and the user-related data.

11. The method of claim 1, wherein the first residual vector data comprises respective items of residual vector data that are associated with a device identifier that identifies the first device, respective process identifiers that identify respective processes associated with the respective items, and respective action data that indicate or describe respective actions associated with the respective processes.

12. The method of claim 1, wherein first items of data from first system calls associated with the first device are processed to generate a first time series of items of data, wherein the first system calls associated with the first device comprise at least one of process control data, device management data, file management data, communication data, or information maintenance data, associated with the first device, wherein the first residual vector data is generated based on the first time series of items of data,
wherein second items of data from second system calls associated with the second device are processed to generate a second time series of items of data, and wherein the second residual vector data is generated based on the second time series of items of data.

13. The method of claim 1, further comprising:
analyzing, by the first device of the system comprising a processor, the first residual vector data; and
determining, by the first device of the system, whether the abnormal behavior associated with the first device exists based on a second result of the analyzing by the first device and based on a defined abnormal device behavior criterion that indicates what constitutes abnormal device behavior.

14. A system, comprising:
at least one memory that stores computer executable components; and
at least one processor that executes computer executable components stored in the at least one memory, wherein the computer executable components comprise:
  a data collector that receives a first group of residual vectors from a first node and a second group of residual vectors from a second node, wherein the first group of residual vectors is representative of a first group of residuals between a first state of behavior of the first node determined to have occurred during a time period and a first predicted state of behavior of the first node that was projected to occur during the time period, and wherein the second group of residual vectors is representative of a second group of residuals between a second state of behavior of the second node determined to have occurred during the time period and a second predicted state of behavior of the second node that was projected to occur during the time period; and
  a security manager that determines whether an abnormal behavior associated with a group of nodes exists based on a result of the analysis of the first group of residual vectors and the second group of residual vectors, and based on a defined abnormal node group behavior criterion that indicates what constitutes abnormal node group behavior associated with the group of nodes, wherein the group of nodes comprises the first node and the second node.

15. The system of claim 14, wherein respective residuals of the first group of residuals relate to respective features associated with the first node, wherein the security management component determines that the abnormal behavior associated with the group of nodes exists based on the result, wherein the result indicates that there is a deviation from a normal node group behavior associated with the group of nodes, and
  wherein, in response to determining that the abnormal behavior associated with the group of nodes exists, the security manager initiates suspension or ceasing of at least one process associated with a threat to network equipment of a communication network that is indicated by the abnormal behavior.

16. The system of claim 15, wherein the result is a first result, wherein, based on the first result of the analyzing, the security manager determines that the abnormal behavior is the threat to the network equipment of the communication network,
  wherein, based on a second result of the analyzing, the security manager verifies whether the abnormal behavior associated with the group of nodes is an actual malicious attack on the network equipment of the communication network by at least some nodes, comprising the first node and the second node, of the group of nodes, and
  wherein, based on a third result of the verifying, the security manager determines whether to discontinue the suspension or the ceasing of at least the one process or continue the suspension or the ceasing of at least the one process.

17. The system of claim 14, wherein the first group of residual vectors comprises structured table data relating to a group of features associated with at least one residual of the first group of residuals associated with the first node that indicates the first node satisfies a defined normal behavior criterion with respect to at least one time instance associated with at least the one residual, wherein the structured table data is indicative of residual vectors represented in a portion of the first group of residual vectors, wherein the residual vectors are representative of some residuals of the first group of residuals, and wherein the structured table data contains a first amount of data that is less data than a second amount of data of the residual vectors to facilitate reducing an amount of bandwidth utilized to receive a third amount of data, comprising the first amount of data, received from the group of nodes via network equipment of a communication network.

18. The system of claim 14, wherein the security manager determines that an initial first group of residual vectors associated with the first node does not comprise a residual vector associated with a time instance of the time period, wherein the determination that the initial first group of residual vectors does not comprise the residual vector associated with the time instance indicates that the residual vector has a zero value and the first node satisfies a defined normal node behavior criterion during the time instance, and
  wherein the security manager inserts a vector value of zero, with regard to the time instance, in the initial first group of residual vectors to generate the first group of residual vectors, to facilitate filling in the residual vector missing from the initial first group of residual vectors.

19. A non-transitory machine-readable medium, comprising executable instructions that, when executed by at least one processor, facilitate performance of operations, comprising:
  evaluating a first group of residual vectors received from a first user equipment and a second group of residual vectors received from a second user equipment, wherein the first group of residual vectors relates to a first group of residuals between a first state of behavior of the first user equipment determined to have occurred during a time period and a first expected state of behavior of the first user equipment that was expected or predicted to occur during the time period, and wherein the second group of residual vectors relates to a second group of residuals between a second state of behavior of the second user equipment determined to have occurred during the time period and a second expected state of behavior of the second user equipment that was expected or predicted to occur during the time period; and
  determining whether a malicious behavior associated with a group of user equipment has occurred based on a result of the evaluating and a defined malicious user equipment group behavior criterion that indicates what constitutes abnormal user equipment group behavior associated with the group of user equipment, wherein the group of user equipment comprises the first user equipment and the second user equipment.

20. The non-transitory machine-readable medium of claim 19, wherein the result is a first result, and wherein the operations further comprise:
  based on the first result of the evaluating indicating that an abnormal behavior associated with the group of user equipment has occurred, determining that the abnormal behavior associated with the group of user equipment has occurred, wherein the result indicates that there is a deviation from a normal user equipment group behavior associated with the group of user equipment;
  in response to determining that the abnormal behavior associated with the group of user equipment has occurred, initiating suspension of at least one process associated with a security threat to network equipment of a communication network indicated by the abnormal behavior;

based on a second result of the evaluating, verifying whether the abnormal behavior associated with the group of user equipment is the malicious behavior constituting an actual malicious attack on the network equipment of the communication network by at least some user equipment, comprising the first user equipment and the second user equipment, of the group of user equipment; and based on a third result of the verifying, determining whether to discontinue the suspension of at least the one process, continue the suspension of at least the one process, or initiate termination of at least the one process.

* * * * *